(12) United States Patent
Chen et al.

(10) Patent No.: US 12,446,034 B2
(45) Date of Patent: Oct. 14, 2025

(54) TRANSMISSION METHOD, CONFIGURATION METHOD, TERMINAL, AND NETWORK-SIDE DEVICE

(71) Applicant: VIVO MOBILE COMMUNICATION CO., LTD., Guangdong (CN)

(72) Inventors: Xiaohang Chen, Guangdong (CN); Zhi Lu, Guangdong (CN); Xueming Pan, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 833 days.

(21) Appl. No.: 17/671,887

(22) Filed: Feb. 15, 2022

(65) Prior Publication Data

US 2022/0174709 A1 Jun. 2, 2022

Related U.S. Application Data

(63) Continuation of application No. PCT/CN2020/108232, filed on Aug. 10, 2020.

(30) Foreign Application Priority Data

Aug. 16, 2019 (CN) .................. 201910760909.X

(51) Int. Cl.
   *H04W 72/1273* (2023.01)
   *H04L 1/1812* (2023.01)
   *H04L 5/00* (2006.01)
   *H04W 72/0446* (2023.01)
   *H04W 72/23* (2023.01)

(52) U.S. Cl.
   CPC ....... *H04W 72/1273* (2013.01); *H04L 1/1812* (2013.01); *H04L 5/0053* (2013.01); *H04W 72/0446* (2013.01); *H04W 72/23* (2023.01)

(58) Field of Classification Search
   None
   See application file for complete search history.

(56) References Cited

U.S. PATENT DOCUMENTS

| | | |
|---|---|---|
| 2017/0303248 A1 | 10/2017 | Chatterjee et al. |
| 2017/0331597 A1 | 11/2017 | Ji et al. |
| 2018/0241510 A1 | 8/2018 | Shen |
| 2019/0037586 A1 | 1/2019 | Park et al. |

(Continued)

FOREIGN PATENT DOCUMENTS

| | | |
|---|---|---|
| CN | 107078863 A | 8/2017 |
| CN | 107332646 A | 11/2017 |

(Continued)

OTHER PUBLICATIONS

Samsung, "DL SPS operation for NR", 3GPP TSG RAN WG1 Meeting 91, R1-1720234, Reno, USA, Nov. 27-Dec. 1, 2017.
VIVO, "Remaining issues on NR CA," 3GPP TSG RAN WG1 Meeting #93 R1-1806073, Busan, Korea, May 21-25, 2018 (5 pages).
Qualcomm Incorporated, "Enhancement to configured grants in NR unlicensed," 3GPP TSG RAN WG1 Meeting #97 R1-1907264, Reno, US May 13-May 17, 2019 (11 pages).

(Continued)

*Primary Examiner* — Christopher T Wyllie
(74) *Attorney, Agent, or Firm* — Price Heneveld LLP

(57) ABSTRACT

A transmission method, a configuration method, a terminal, and a network-side device. The method includes: receiving a physical downlink shared channel (PDSCH); and determining a transmission parameter of a Hybrid Automatic Repeat reQuest Acknowledgment (HARQ-ACK) codebook corresponding to the PDSCH according to a time domain resource format of a transmission resource.

12 Claims, 13 Drawing Sheets

(56) References Cited

U.S. PATENT DOCUMENTS

| | | | |
|---|---|---|---|
| 2019/0159251 A1 | 5/2019 | Li et al. | |
| 2020/0092068 A1* | 3/2020 | Yang | H04W 52/06 |
| 2020/0177352 A1 | 6/2020 | Peng et al. | |
| 2020/0213997 A1 | 7/2020 | Lu et al. | |
| 2020/0259594 A1 | 8/2020 | Takeda et al. | |
| 2020/0344728 A1 | 10/2020 | Gao et al. | |
| 2020/0396760 A1* | 12/2020 | Yi | H04W 72/23 |
| 2021/0050948 A1 | 2/2021 | Gao et al. | |
| 2021/0058196 A1* | 2/2021 | Chen | H04W 72/23 |

FOREIGN PATENT DOCUMENTS

| | | |
|---|---|---|
| CN | 109152010 A | 1/2019 |
| CN | 109391422 A | 2/2019 |
| CN | 109787734 A | 5/2019 |
| CN | 109802771 A | 5/2019 |
| CN | 110034862 A | 7/2019 |
| CN | 110034878 A | 7/2019 |
| CN | 110034892 A | 7/2019 |
| WO | 2019030871 A1 | 2/2019 |
| WO | 2019095945 A1 | 5/2019 |
| WO | 2019098761 A1 | 5/2019 |
| WO | 2019153964 A1 | 8/2019 |

OTHER PUBLICATIONS

Samsung, "Corrections on HARQ Feedback," 3GPP TSG RAN WG1 #AH 1801 R1-1800453, Vancouver, Canada, Jan. 22-26, 2018 (9 pages).

Interdigital, Inc., "Remaining issues on HARQ-ACK codebook," 3GPP TSG RAN WG1 Meeting #92 R1-1802573 Athens, Greece, Feb. 26-Mar. 2, 2018 (3 pages).

CMCC, "Discussion on HARQ timing for DL SPS," 3GPP TSG RAN WG1 Meeting #92bis R1-1804102, Sanya, China, Apr. 16-20, 2018 (3 pages).

VIVO, "Remaining issues on HARQ management for eMBB," 3GPP TSG RAN WG1 Meeting #93 R1-1806068 (Revision of R1-1803837) Busan, Korea, May 21-25, 2018 (5 pages).

Huawei, Hisilicon, "Discussion on semi-static HARQ-ACK codebook when slot aggregation for UCI reliability," 3GPP TSG RAN WG1 Meeting #93 R1-1807138, Busan, Korea, May 21-25, 2018 (8 pages).

"3rd Generation Partnership Project; Technical Specification Group Radio Access Network; NR; Physical layer procedures for control (Release 15)", 3GPP TS 38.213 V15.6.0 (Jun. 2019), Valbonne, France.

* cited by examiner

TRANSMISSION METHOD, CONFIGURATION METHOD, TERMINAL, AND NETWORK-SIDE DEVICE

CROSS-REFERENCE TO RELATED APPLICATIONS

This application is a continuation application of International Application No. PCT/CN2020/108232 filed on Aug. 10, 2020, which claims priority to Chinese Patent Application No. 201910760909.X filed on Aug. 16, 2019, which are incorporated herein by reference in their entireties.

TECHNICAL FIELD

The present disclosure relates to the field of communications technologies, and in particular, to a transmission method, a configuration method, a terminal, and a network-side device.

BACKGROUND

In the related art, after receiving a downlink Semi-Persistent Scheduling (DL SPS) physical downlink shared channel (PDSCH), user equipment (UE) determines a slot offset between a feedback slot of a Hybrid Automatic Repeat reQuest Acknowledgment (HARQ-ACK) and a reception end slot of the PDSCH according to a K value indicated by a network side using downlink control information (DCI) or a default value, and generates and transmits a HARQ-ACK codebook based on the feedback slot.

However, the transmission direction of a slot in New Radio (NR) has three definitions: downlink (DL), uplink (UL), and flexible. Moreover, the transmission direction of a flexible slot can be changed by UL and DL configurations.

Therefore, if the feedback slot is determined based on the K value, it is likely that the HARQ-ACK cannot be transmitted because the transmission direction of the feedback slot is changed, further causing the HARQ-ACK codebook to be discarded, and lowering the success rate of the transmission.

SUMMARY

Embodiments of the present disclosure provide a transmission method, a configuration method, a terminal, and a network-side device.

According to a first aspect, an embodiment of the present disclosure provides a transmission method, applied to a terminal, the transmission method including:

receiving a PDSCH; and determining a transmission parameter of a HARQ-ACK codebook corresponding to the PDSCH according to a time domain resource format of a transmission resource.

According to a second aspect, an embodiment of the present disclosure provides a configuration method, applied to a network-side device, the configuration method including:

sending configuration information, where the configuration message is used for indicating a first time domain resource, where the first time domain resource is a time domain resource for HARQ-ACK feedback.

According to a third aspect, an embodiment of the present disclosure provides a terminal, including:

a first receiving module, configured to receive a PDSCH; and a determining module, configured to determine a transmission parameter of a HARQ-ACK codebook corresponding to the PDSCH according to a time domain resource format of a transmission resource.

According to a fourth aspect, an embodiment of the present disclosure provides a network-side device, including:

a transmitting module, configured to send configuration information, where the configuration message is used for indicating a first time domain resource, where the first time domain resource is a time domain resource for HARQ-ACK feedback.

According to a fifth aspect, an embodiment of the present disclosure provides a terminal, including a processor, a memory, and a computer program stored on the memory and executable on the processor, where when executed by the processor, the computer program implements the steps in the foregoing transmission method.

According to a sixth aspect, an embodiment of the present disclosure provides a network-side device, including a processor, a memory, and a computer program stored on the memory and executable on the processor, where when executed by the processor, the computer program implements the steps in the foregoing configuration method.

According to a seventh aspect, an embodiment of the present disclosure provides a computer-readable storage medium, storing a computer program, where when executed by a processor, the computer program implements the steps in the foregoing transmission method.

According to an eighth aspect, an embodiment of the present disclosure provides a computer-readable storage medium, storing a computer program, where when executed by a processor, the computer program implements the steps in the foregoing configuration method.

BRIEF DESCRIPTION OF THE DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

For the ease of understanding the embodiments of the present disclosure, some related concepts are described first.

HARQ-ACK timing is defined as an interval from an end moment of DL data reception to a moment at which a corresponding ACK/NACK is fed back. NR supports flexible HARQ-ACK timing configuration to adapt to different services and network deployments. Each UE can configure a UE-specific HARQ-ACK timing table through radio resource control (RRC). The table includes a plurality of HARQ-ACK timing values, referred to as K values, where K is in slot. When dynamically scheduling DL data transmission, the base station indicates a K value as an index in the DCI. K is a value selected from the UE-specific HARQ-ACK timing table and is used for inform the UE of a moment at which the HARQ-ACK is fed back.

If the DCI does not include or indicate a HARQ-ACK timing value, the UE may determine an interval from DL data to HARQ-ACK feedback according to a fixed value. For a DL SPS PDSCH sent in a slot n, its corresponding HARQ-ACK is transmitted on a slot n+K, where K is indicated in the DCI that activates the DL SPS.

To achieve flexible network deployment, the transmission direction of each symbol in a slot can be configured in a slot format in the NR system.

Figure 1:
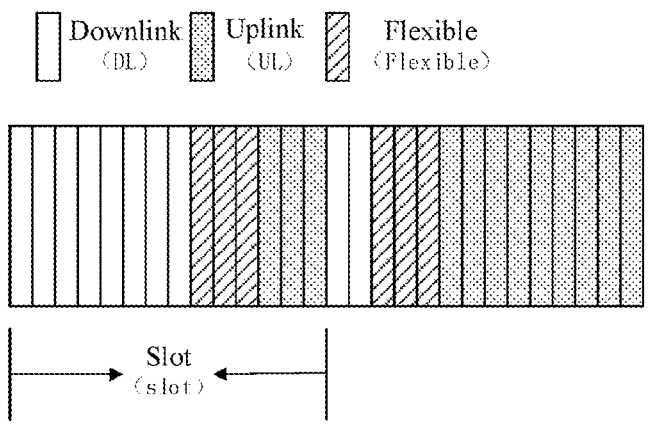
FIG. 1 is a schematic diagram of a slot format according to an embodiment of the present disclosure.

The transmission direction of a slot in NR has three definitions: downlink (DL), uplink (UL), and flexible. When the network configures that a slot or a symbol is DL or UL, the transmission direction at the moment is clear. When the network configures that a slot or a symbol is flexible, the transmission direction at the moment is to be determined. The network may change the transmission direction of the flexible slot or symbol using dynamic signaling such as a dynamic slot format indicator (SFI). As shown in FIG. 1, a slot may include DL, UL, and flexible orthogonal frequency division multiplexing (OFDM) symbols. The flexible symbol may be rewritten as a DL or UL symbol.

The SFI may indicate the format of one or more slots. The SFI can flexibly change the format of a slot according to the demands, to meet the service transmission requirements. The UE can determine whether to monitor the PDCCH according to the indication of the SFI.

The base station may semi-persistently configure one or more cell-specific slot formats for the UE by using a high-level parameter UL-DL-Configuration-Common or UL-DL-Configuration-Common-Set2 (optional).

The base station may alternatively semi-persistently configure one or more cell-specific slot formats for the UE by using a high-level parameter UL-DL-Configuration-Dedicated.

A time domain resource format is an implicit configuration, and for example, is implicitly indicated through measurement.

Figure 2:
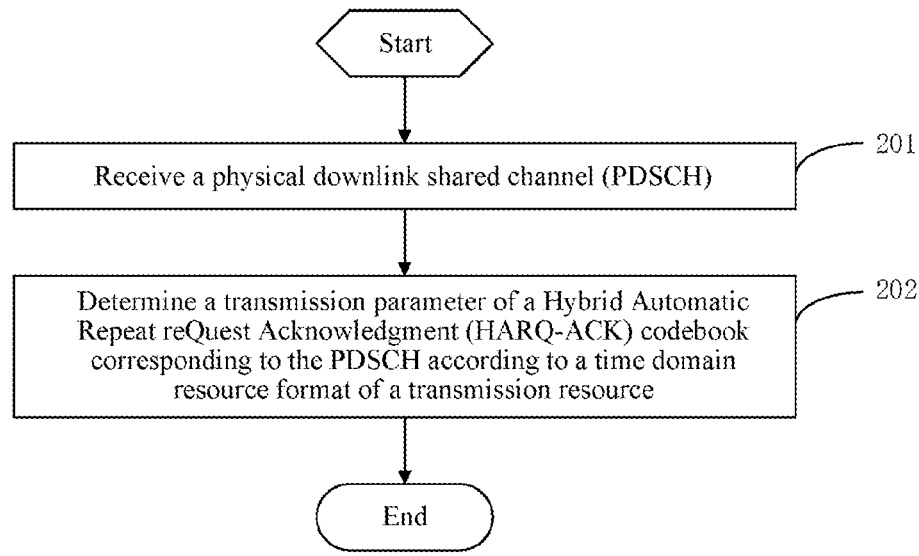
FIG. 2 is a flowchart of a transmission method according to an embodiment of the present disclosure.

FIG. 2 is a flowchart of a transmission method according to an embodiment of the present disclosure, which is applied to a terminal. As shown in FIG. 2, the transmission method includes the following steps:

Step 201: Receive a PDSCH.

The PDSCH may be sent by a network-side device, for example, a base station.

Step 202: Determine a transmission parameter of a HARQ-ACK codebook corresponding to the PDSCH according to a time domain resource format of a transmission resource.

In this embodiment of the present disclosure, to improve the transmission success rate of the HARQ-ACK, a transmission parameter of a HARQ-ACK codebook corresponding to the PDSCH may be determined according to a time domain resource format of a transmission resource. The time domain resource format may indicate the transmission direction of the transmission resource in each time domain, so that the terminal may determine, according to time domain resource format of the transmission resource, a time domain resource that can be used for transmitting the HARQ-ACK codebook. For example, the time domain resource format may include three types: UL, DL, and flexible. When it is determined that a time domain resource format of a specific time domain resource in the transmission resource is UL, the HARQ-ACK can be transmitted on the time domain resource.

Different from the related art, in the method in a specific embodiment of the present disclosure, a generation position and/or a transmission resource of a HARQ-ACK codebook are or is determined using a time domain resource format (or a transmission direction) of a transmission resource instead of being determined directly according to an offset. Therefore, in the method of this embodiment of the present disclosure, availability of a transmission resource is first determined according to a time domain resource format of the transmission resource. In other words, in the method of this embodiment of the present disclosure, an available resource is selected according to time domain resource formats of transmission resources for generating and transmitting a codebook, so that the resource inconsistency problem can be alleviated, thereby improving the transmission success rate of the HARQ-ACK codebook.

Processing of the HARQ-ACK codebook includes two aspects: generating a HARQ-ACK codebook and transmitting the HARQ-ACK codebook. In a specific embodiment of the present disclosure, a transmission parameter of the HARQ-ACK codebook may be applied to at least one of the foregoing two aspects.

That is, in a specific embodiment of the present disclosure, the transmission parameter may be a time domain position parameter used for determining the generation position of the HARQ-ACK codebook or a resource indication parameter used for determining a time domain transmission resource of the HARQ-ACK codebook, or may include both the time domain position parameter and the resource indication parameter.

In other words, the transmission parameter can determine to generate the HARQ-ACK codebook on which time domain resource (such as a slot) and/or to transmit the HARQ-ACK codebook on which time domain resource (such as a slot).

Certainly, the transmission parameter may alternatively be another parameter that determines a HARQ-ACK codebook and that is related to a resource transmission direction.

The method in a specific embodiment of the present disclosure may be applied to a PDSCH scheduled in real time, or may be applied to a PDSCH sent based on semi-persistent scheduling (SPS).

Compared with conventional mobile communications systems, 5G mobile communications systems in the future need to adapt to more diversified scenarios and service requirements. Main application scenarios of 5G New Radio (NR) include Enhanced Mobile Broadband (eMBB), massive Machine Type of Communication (mMTC), and Ultra Reliable & Low Latency Communication (URLLC). The scenarios raise requirements, such as high reliability, low latency, large bandwidth, and broad coverage, for systems.

Services in the different scenarios have different quality of service (QoS) requirements. For example, the URLLC supports low latency and high reliable services. To achieve higher reliability, data needs to be transmitted using a lower bit rate, and in addition, faster and more accurate channel state information (CSI) feedback is required. The eMBB service requires a high throughput, but is less sensitive to the latency and reliability than the URLLC. In addition, some UEs may support services with different numerologies. The UEs not only support low-latency and high-reliability services of URLLC, but also support the large-capacity and high-rate eMBB services.

For services that appear periodically and have data packets of a relatively fixed size, to reduce the overheads of DL control signaling, the network side may adopt an SPS method to continuously allocate some resources for transmission of the periodical services. Such a method of SPS on a DL is referred to as DL SPS, which can reduce the overheads of scheduling Voice over Long-Term Evolution (VoLTE) voice packets that are sent periodically and are relatively small, so that more resources can be used for scheduling additional UEs.

The network side may configure, through high layer signaling, parameters, such as periodicity a quantity of HARQ processes, and a HARQ-ACK feedback resource, required by DL SPS for the UE. After the UE is configured with a DL SPS configuration, the base station may activate the configured DL SPS configuration using DCI. The DCI includes resources for DL SPS transmission and transmission parameters such as modulation and coding scheme (MCS). By receiving activation DCI, the UE determines a moment of DL SPS transmission and a frequency resource at the corresponding moment. At each DL SPS moment, the UE monitors whether corresponding data is transmitted on the DL SPS resource.

However, for an SPS-based PDSCH, the same configuration is used for performing channel scheduling and HARQ-ACK feedback within a specific time. In this period, due to changes of various states of the network, requirements for service scheduling, or the like, transmission directions of some of the transmission resources are more likely to be changed, and a HARQ-ACK codebook corresponding to the SPS-based PDSCH is more likely to be discarded.

Therefore, applying the method in a specific embodiment of the present disclosure to the PDSCH sent based on SPS can improve the transmission success rate of the HARQ-ACK codebook more effectively.

The method in a specific embodiment of the present disclosure can be directly applied to HARQ-ACK codebook feedback, or may be combined with HARQ-ACK codebook feedback in the related art, so that the foregoing transmission parameters are determined again when the HARQ-ACK codebook cannot be fed back using the transmission resource determined by applying the related art.

In this method, the step 202 further includes:

determining the transmission parameter of the HARQ-ACK codebook corresponding to the PDSCH according to the time domain resource format of the transmission resource when the HARQ-ACK codebook cannot be transmitted in a feedback slot, where a slot offset between the feedback slot and a reception slot of the PDSCH is K, where K is indicated by DCI, or K is a default value.

That is, step 202 further includes:

determining a feedback slot of the PDSCH, where a slot offset between the feedback slot and a reception slot of the PDSCH is K, where K is indicated by DCI, or K is a default value; and determining a transmission parameter of a HARQ-ACK codebook corresponding to the PDSCH according to a time domain resource format of the transmission resource when the HARQ-ACK codebook cannot be transmitted in the feedback slot.

Moreover, whether the HARQ-ACK codebook can be transmitted in the feedback slot may be determined according to the subsequent semi-persistent UL/DL configuration, the subsequent dynamic UL/DL configuration, and the like.

In this implementation, the terminal may preferentially determine the feedback slot based on the value of the HARQ-ACK timing indicated by the network-side device using DCI, that is, the K value or a default value K, and generate and transmit the HARQ-ACK codebook in the feedback slot, where a slot offset between the feedback slot and a reception slot of the PDSCH is K. Therefore, the feedback slot can be determined according to the reception slot of the PDSCH and K.

When the HARQ-ACK codebook cannot be transmitted in the feedback slot, for example, the feedback slot is changed into the DL format, a time domain position for generating the HARQ-ACK codebook and a time domain transmission resource for transmitting the HARQ-ACK codebook are determined in a manner of determining a transmission parameter of a HARQ-ACK codebook corresponding to the PDSCH according to a time domain resource format of the transmission resource.

For example, the feedback slot is a DL slot as indicated by semi-persistent UL/DL configuration (that is, the slot does not include a UL resource). In this case, it can be determined that the feedback slot cannot be used for transmitting the HARQ-ACK codebook. In another example, the feedback slot is a DL slot indicated by dynamic UL/DL configuration signaling (that is, the slot does not include a UL resource). In this case, it can also be determined that the feedback slot cannot be used for transmitting the HARQ-ACK codebook.

Therefore, in a specific embodiment of the present disclosure, availability of a transmission resource is determined according to a time domain resource format of the transmission resource. In other words, in the method of this embodiment of the present disclosure, an available resource is selected according to time domain resource formats of transmission resources for generating and transmitting a codebook. Moreover, the time domain resource format of transmission resource may be determined according to various methods, for example, be determined according to time domain resource format configuration information or resource usage configuration information.

That is, step 202 may include:

determining the transmission parameter of the HARQ-ACK codebook corresponding to the PDSCH according to a target transmission resource, where the target transmission resource is determined according to time domain resource format configuration information or resource usage configuration information.

In a specific embodiment of the present disclosure, the time domain resource format configuration information may be understood as an explicit time domain resource format of a transmission resource, and the resource usage configuration information may be understood as an implicit time domain resource format of the transmission resource.

In this implementation, the transmission parameter of the HARQ-ACK codebook corresponding to the PDSCH may be determined according to a target transmission resource. The target transmission resource may be determined according to two different types of resource configuration information. The two methods are described respectively below:

The first method is to determine the target transmission resource according to resource usage configuration information. The resource usage configuration information may be information configured by the network-side device for indicating usage of each transmission resource. For example, the network-side device may configure usage of each transmission resource, for example, configure a resource for transmitting UL data/signaling, in another example, configure a resource for transmitting DL data/signaling, and in another example, configure a resource for transmitting a HARQ-ACK, so that the terminal can determine the target transmission resource according to the resource usage configuration information.

That is, the target transmission resource includes a first time domain resource, where the first time domain resource includes a time domain resource configured by the network-side device for HARQ-ACK feedback, so that the terminal can transmit the HARQ-ACK codebook on the time domain resource for HARQ-ACK feedback.

The second method is to determine the target transmission resource according to time domain resource format configuration information. The time domain resource format configuration information may be time division duplexing (TDD) configuration information in semi-persistent configuration or may be configuration information in the dynamic configuration signaling.

A format of each time domain resource, for example, a UL resource, a DL resource, or a flexible resource, may be indicated in the semi-persistent UL/DL configuration, so that a target time domain resource of which the time domain resource format is UL can be determined according to the semi-persistent UL/DL configuration. A format of each time domain resource may also be indicated in the dynamic configuration signaling, so that the terminal can also determine, according to the dynamic configuration signaling, a target time domain resource of which the time domain resource format is UL.

Certainly, the terminal may alternatively determine, according to both the semi-persistent UL/DL configuration and the dynamic configuration signaling configuration, a target time domain resource of which the time domain resource format is UL.

That is, the target transmission resource may include a second time domain resource and/or a third time domain resource, where the second time domain resource includes a time domain resource of which a time domain resource format is UL as indicated by semi-persistent UL/DL configuration; and the third time domain resource includes a time domain resource of which a time domain resource format is UL as indicated by dynamic UL/DL configuration signaling. In this way, the terminal can determine, according to either the second time domain resource or the third time domain resource, the time domain resource of which the time domain resource format is UL, and transmit the HARQ-ACK codebook on the time domain resource.

In consideration of an execution time of the dynamic UL/DL configuration signaling, to make the network-side device and the terminal understood in a centralized manner, in a specific embodiment of the present disclosure, it may be required that: a time interval between a reception time of the dynamic UL/DL configuration signaling and the third time domain resource in time domain is greater than or equal to a preset value.

When the target transmission resource is the third time domain resource, a time interval between a reception time of the dynamic UL/DL configuration signaling and the time domain resource of which the time domain resource format is UL as indicated by the dynamic UL/DL configuration signaling in time domain is greater than or equal to a preset value.

That is, when an interval between the slot position of the target transmission resource and a time of receiving the dynamic UL/DL configuration signaling is the preset value, the terminal starts to transmit the HARQ-ACK codebook only after at least a time length of the preset value after the dynamic UL/DL configuration signaling is received. In this way, it can be ensured that a sufficient time is reserved for the terminal to process the dynamic UL/DL configuration signaling or the PDSCH channel.

Optionally, the first time domain resource is associated with at least one PDSCH transmission occasion, and an offset between the first time domain resource and the at least one PDSCH transmission occasion in time domain is greater than or equal to K time units, where K is indicated by DCI, or K is a default value.

When the target transmission resource includes a first time domain resource, that is, include a time domain resource configured by the network-side device for HARQ-ACK feedback, the first time domain resource may be associated with at least one PDSCH transmission occasion, and an offset between the first time domain resource and the at least one PDSCH transmission occasion in time domain is greater than or equal to K time units, to ensure that the terminal has a sufficient time to demodulated the received PDSCH channel, thereby avoiding that the HARQ-ACK cannot be correctly transmitted when the terminal does not complete processing the PDSCH.

The time unit may be a slot or another unit such as a minislot or a symbol.

It has been mentioned above that the transmission parameter includes at least one of the following parameters: a time domain position parameter used for indicating a generation position of the HARQ-ACK codebook or a resource indication parameter used for indicating a time domain transmission resource of the HARQ-ACK codebook.

The determining of a time domain position parameter and a resource indication parameter is further described below with reference to the target transmission resource.

The target transmission resource is a transmission resource that can be used to transmit the HARQ-ACK codebook, and a time domain position indicated by the time domain position parameter is a time domain position corresponding to the target transmission resource;

or the target transmission resource is a transmission resource that can be used to transmit the HARQ-ACK codebook, and a time domain resource indicated by the resource indication parameter is the target transmission resource;

or the target transmission resource is a transmission resource that can be used to transmit the HARQ-ACK codebook, a time domain position indicated by the time domain position parameter is a time domain position corresponding to the target transmission resource, and a time domain resource indicated by the resource indication parameter is the target transmission resource.

That is, the target transmission resource may be a transmission resource that can be used to transmit the HARQ-ACK codebook, and when the transmission parameter includes a time domain position parameter, a time domain position indicated by the time domain position parameter is a time domain position corresponding to the target transmission resource. The terminal may generate the HARQ-ACK codebook at a time domain position corresponding to the target transmission resource.

The target transmission resource may be a transmission resource that can be used to transmit the HARQ-ACK codebook, and when the transmission parameter includes a resource indication parameter, a time domain resource indicated by the resource indication parameter is the target transmission resource. The terminal may transmit the HARQ-ACK codebook on the target transmission resource.

The target transmission resource may be a transmission resource that can be used to transmit the HARQ-ACK codebook, and when the transmission parameter includes a time domain position parameter and a resource indication parameter, a time domain position indicated by the time domain position parameter is a time domain position corresponding to the target transmission resource, and a time domain resource indicated by the resource indication parameter is the target transmission resource. The terminal may generate the HARQ-ACK codebook at a time domain position corresponding to the target transmission resource, and transmit the HARQ-ACK codebook on the target transmission resource.

When the target transmission resource includes a first time domain resource (a time domain resource configured by the network-side device for HARQ-ACK feedback), a slot format of the first time domain resource may be reconfigured by the network-side device, resulting in a failure of transmitting the HARQ-ACK codebook on the first time domain resource. In this case, to avoid the problem that the understandings of the network-side device and the terminal are inconsistent, generating the HARQ-ACK codebook is directly skipped, or transmitting the HARQ-ACK codebook on the target transmission resource is skipped.

That is, after step 202, the transmission method further includes:

performing at least one of the following operations when a time domain resource format of the target transmission resource is inconsistent with a time domain resource format indicated by UL/DL configuration: skipping generating the HARQ-ACK codebook at a time domain position corresponding to the target transmission resource, or skipping transmitting the HARQ-ACK codebook on the target transmission resource.

The time domain resource format of the target transmission resource is inconsistent with the time domain resource format indicated by the UL/DL configuration, which may be understood as a case that the target transmission resource is additionally configured by the network-side device as a DL or flexible time domain resource. In this case, because the UL resource cannot be transmitted on the target transmission resource, the terminal may skip generating the HARQ-ACK codebook at a time domain position corresponding to the target transmission resource, or skip transmitting the HARQ-ACK codebook on the target transmission resource.

When the target transmission resource includes a first time domain resource (a time domain resource configured by the network-side device for HARQ-ACK feedback), the configuration information of the first time domain resource may be sent by the network-side device to the terminal. That is, when the target transmission resource includes a first time domain resource, the transmission method further includes:

receiving a configuration message, where the configuration message is used for indicating the first time domain resource.

In this implementation, the target transmission resource may be indicated by the network-side device delivering a configuration message, that is, the network-side device may send, to the terminal, a configuration message used for indicating the first time domain resource, and the terminal may receive the configuration message, so as to determine, according to the configuration message, a time domain resource configured by the network-side device for HARQ-ACK feedback, and transmit the HARQ-ACK codebook on the time domain resource.

The configuration message indicates the first time domain resource using a first parameter group or a second parameter group.

The first parameter group includes a periodicity parameter, used for indicating a repetition period of the first time domain resource; and a first position parameter, used for indicating a time domain position of the first time domain resource within one period.

The second parameter group includes a periodicity parameter, used for indicating a repetition period of the first time domain resource; and a second position parameter, used for indicating a time domain offset of the first time domain resource relative to a period boundary.

The configuration message may indicate the first time domain resource using two different methods. The first method is indicating the first time domain resource using a first parameter group. The first parameter group may include a periodicity parameter and a first position parameter. The periodicity parameter is used for indicating a repetition period of the first time domain resource. The first position parameter is used for indicating a time domain position of the first time domain resource within one period. That is, the network-side device may configure a period of a time domain resource for HARQ-ACK feedback, and indicate, within a time range of the period, a time domain resource position for HARQ-ACK feedback within the period using a bitmap, so that the terminal can determine, according to the first parameter group, a time domain resource position for generating and transmitting the HARQ-ACK codebook within each period.

The second method is indicating the first time domain resource using a second parameter group. The second parameter group may include a periodicity parameter and a second position parameter. Likewise, the periodicity parameter can be used for indicating a repetition period of the first time domain resource. The second position parameter can be used for indicating a time domain offset of the first time domain resource relative to a period boundary. That is, a reference point of the time domain offset is a boundary of the period, and the time domain resource position for HARQ-ACK feedback can be determined according to the period and the offset within the period, so that the terminal can determine, according to the second parameter group, a time domain resource position for generating and transmitting the HARQ-ACK codebook within each period.

In the embodiments of the present disclosure, the foregoing terminal may be any device with a storage medium, for example, a terminal device such as a computer, a mobile phone, a tablet computer, a laptop computer, a personal digital assistant (PDA), a mobile Internet device (MID), or a wearable device.

How to determine a generation position of a codebook and a transmission resource for the codebook in the method of the embodiments of the present disclosure is further described below using examples with reference to specific slot numbers.

It is assumed that UE receives at least one DL SPS PDSCH in slots n to n+X. If semi-persistent UL/DL configuration indicates that slots n+K to n+X+K are DL or flexible, the UE determines a generation position of a HARQ-ACK codebook according to a resource configured by the network-side device for HARQ-ACK feedback (that is, the first time domain resource).

Example 1:

It is assumed that K=1 slot.

Figure 3:
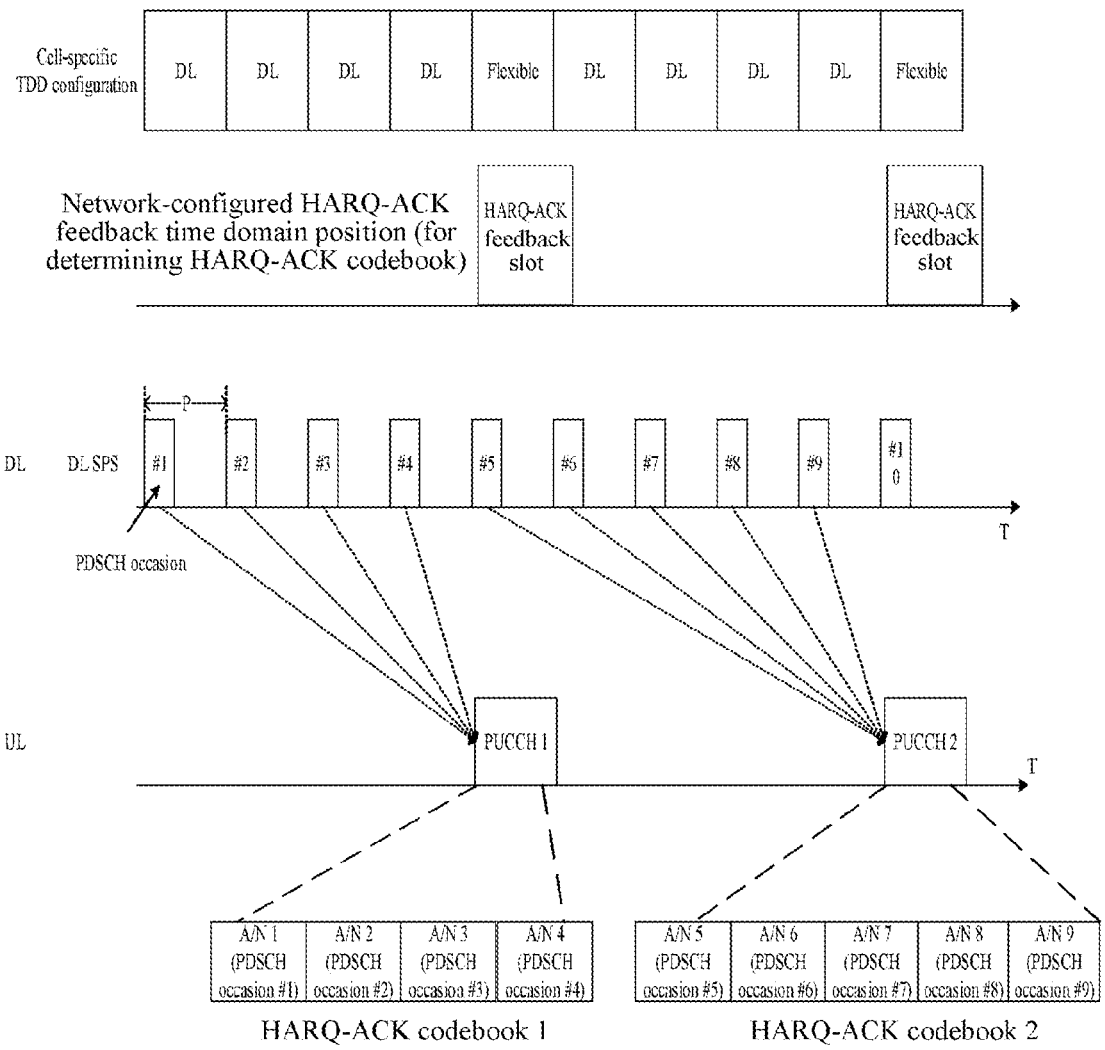
FIG. 3 is a schematic diagram 1 of determining a HARQ-ACK codebook generation position according to an embodiment of the present disclosure.

The UE is configured with cell-specific TDD configuration information, indicating a slot format shown in FIG. 3.

The network-side device configures, for the UE, HARQ-ACK feedback time domain positions for determining a HARQ-ACK codebook, which are, as shown in FIG. 3, slots #5 and #10.

The UE determines, according to the HARQ-ACK feedback time domain positions configured by the network-side device, to generate a HARQ-ACK codebook 1 in the slot #5. The HARQ-ACK codebook 1 is associated with SPS PDSCH occasions #1 to #4 (because time intervals between slots of the PDSCH occasions #1 to #4 and the slot #5 are greater than or equal to K).

In addition, the UE determines to generate a HARQ-ACK codebook 2 in the slot #10. The HARQ-ACK codebook 2 is associated with SPS PDSCH occasions #5 to #9 (although the SPS PDSCH occasion #5 is consistent with the slot format, and the PDSCH cannot be transmitted, in this embodiment, when the HARQ-ACK codebook is generated, the HARQ-ACK codebook still needs to be associated with the PDSCH occasions).

Example 2: The UE is configured with cell-specific TDD configuration information, indicating that formats of all slots are flexible; or the UE is not configured with cell-specific TDD configuration information, that is, the UE considers that the formats of all slots are flexible.

Figure 4:
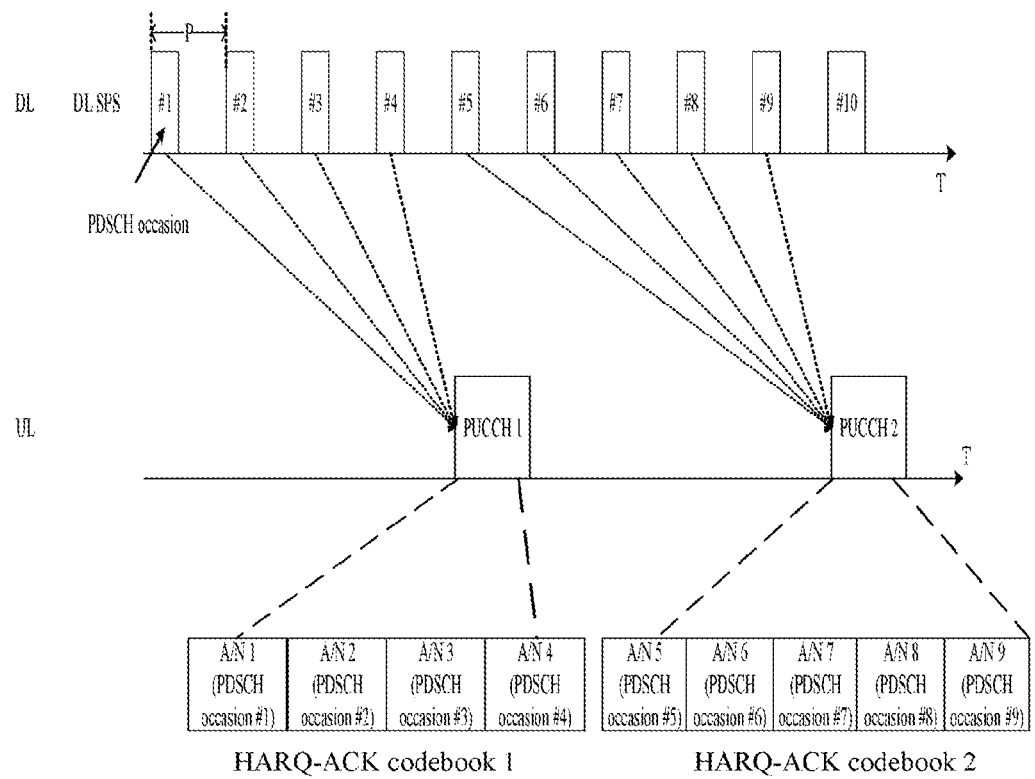
FIG. 4 is a schematic diagram 2 of determining a HARQ-ACK codebook generation position according to an embodiment of the present disclosure.

The network-side device configures, for the UE, HARQ-ACK feedback time domain positions for determining a HARQ-ACK codebook, which are, as shown in FIG. 4, slots #5 and #10.

The UE determines, according to the HARQ-ACK feedback time domain positions configured by the network-side device, to generate a HARQ-ACK codebook 1 in the slot #5. The HARQ-ACK codebook 1 is associated with SPS PDSCH occasions #1 to #4 (because time intervals between slots of the PDSCH occasions #1 to #4 and the slot #5 are greater than or equal to K).

In addition, the UE determines to generate a HARQ-ACK codebook 2 in the slot #10. The HARQ-ACK codebook 2 is associated with SPS PDSCH occasions #5 to #9.

It is assumed that UE receives at least one DL SPS PDSCH in slots n to n+X. If semi-persistent UL/DL configuration indicates that slots n+K to n+X+K are DL or flexible, the UE determines a generation position of a HARQ-ACK codebook according to the UL resources following the slots n+K to n+X+K indicated by the semi-persistent UL/DL configuration.

It is assumed that K=1 slot.

Figure 5:
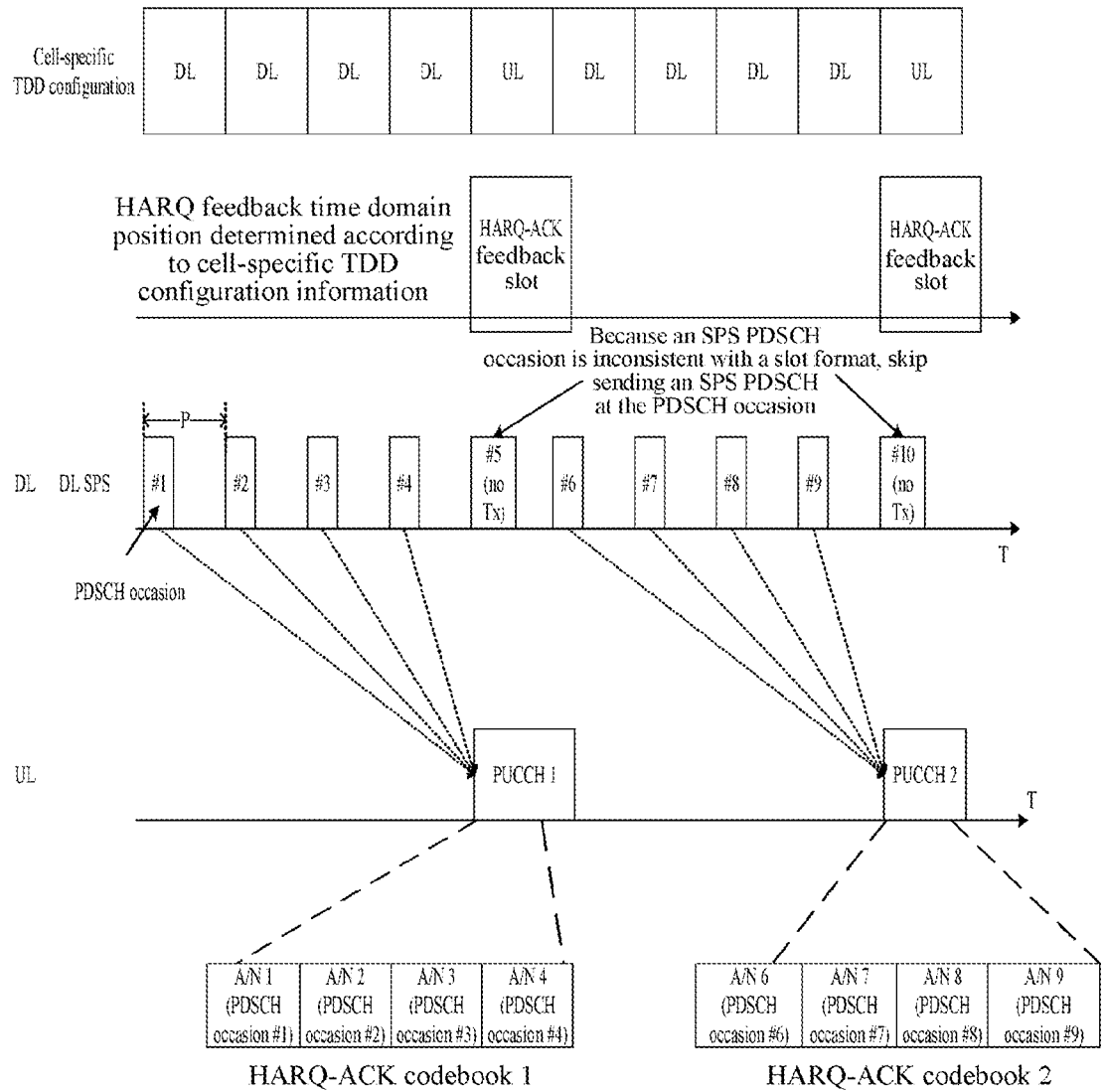
FIG. 5 is a schematic diagram 3 of determining a HARQ-ACK codebook generation position according to an embodiment of the present disclosure.

The UE is configured with cell-specific TDD configuration information, indicating a slot format shown in FIG. 5. The TDD configuration information indicates thin the slots #5 and #10 are UL.

The UE determines the HARQ-ACK feedback time domain positions according to the TDD configuration information, and determines to generate a HARQ-ACK codebook 1 in the slot #5. The HARQ-ACK codebook 1 is associated with SPS PDSCH occasions #1 to #4 (because time intervals between slots of the PDSCH occasions #1 to #4 and the slot #5 are greater than or equal to K).

In addition, the UE determines to generate a HARQ-ACK codebook 2 in the slot #10. The HARQ-ACK codebook 2 is associated with SPS PDSCH occasions #5 to #9 (because the SPS PDSCH occasion #5 is consistent with the slot format indicated by the TDD configuration information, and the PDSCH cannot be transmitted, when the HARQ-ACK codebook is generated, the PDSCH occasion is not associated with the HARQ-ACK codebook 2).

It is assumed that UE receives at least one DL SPS PDSCH in slots n to n+X. If dynamic UL/DL configuration signaling indicates that slots n+K to n+X+K are DL or flexible, the UE determines a generation position of a HARQ-ACK codebook according to the UL resources following the slots n+K to n+X+K indicated by the dynamic UL/DL configuration signaling.

It is assumed that K=1 slot.

Figure 6:
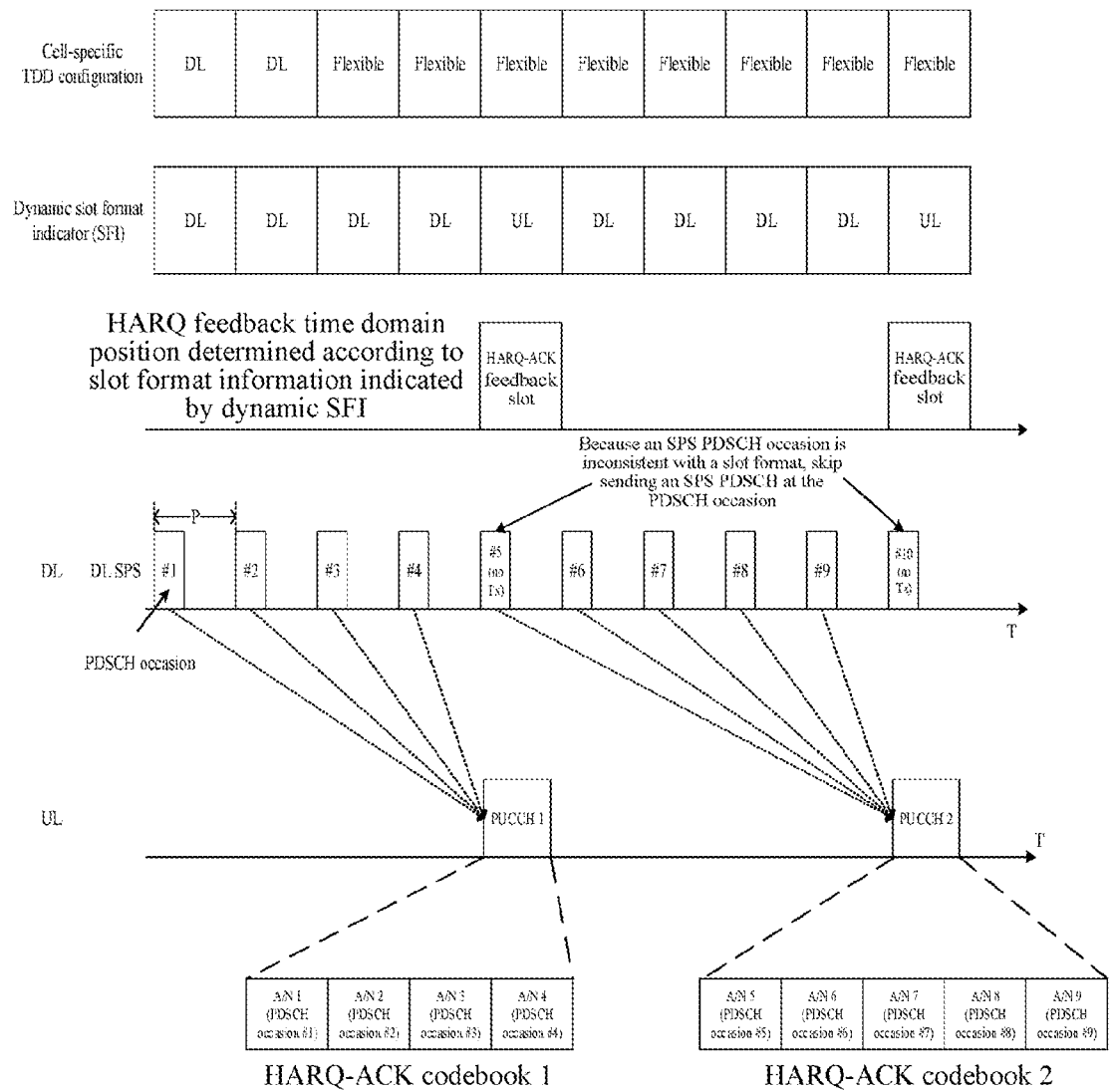
FIG. 6 is a schematic diagram 4 of determining a HARQ-ACK codebook generation position according to an embodiment of the present disclosure.

The UE is configured with cell-specific TDD configuration information, indicating a slot format shown in FIG. 6.

The UE is configured to receive a dynamic SFI. The UE detects an SFI, indicating a slot format shown in FIG. 6. The SFI indicates that slots #5 and #10 are UL.

The UE determines the HARQ-ACK feedback time domain positions according to the UL resource positions indicated by the SFI, and determines to generate a HARQ-ACK codebook 1 in the slot #5. The HARQ-ACK codebook 1 is associated with SPS PDSCH occasions #1 to #4 (because time intervals between slots of the PDSCH occasions #1 to #4 and the slot #5 are greater than or equal to K).

In addition, the UE determines to generate a HARQ-ACK codebook 2 in the slot #10. The HARQ-ACK codebook 2 is associated with SPS PDSCH occasions #5 to #9 (although the SPS PDSCH occasion #5 is consistent with the slot format indicated by the SFI, and the PDSCH cannot be transmitted, when the HARQ-ACK codebook is generated, the PDSCH occasion still needs to be associated with the HARQ-ACK codebook 2).

It is assumed that UE receives at least one DL SPS PDSCH in slots n to n+X. If dynamic UL/DL configuration signaling indicates that slots n+K to n+X+K are DL or flexible, the UE determines a generation position of a HARQ-ACK codebook according to the UL resources following the slots n+K to n+X+K indicated by the dynamic UL/DL configuration signaling. A time interval between the UL resource indicated by the SFI and the dynamic signaling indicating the slot format is greater than a preset value T.

It is assumed that T=2 slots.

Figure 7:
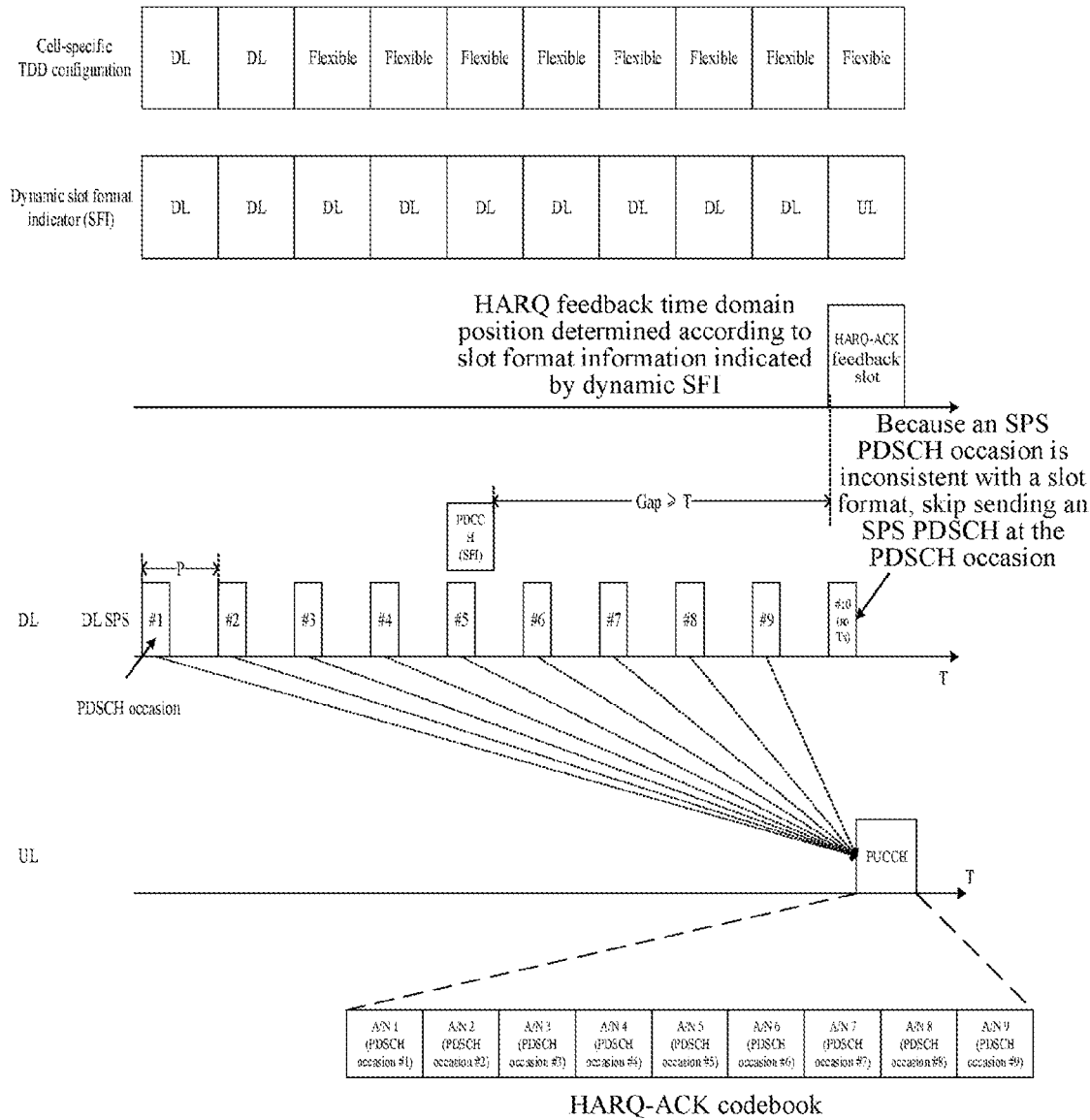
FIG. 7 is a schematic diagram 5 of determining a HARQ-ACK codebook generation position according to an embodiment of the present disclosure.

The UE is configured with cell-specific TDD configuration information, indicating a slot format shown in FIG. 7.

The UE is configured to receive a dynamic SFI. The UE detects an SFI at a slot #5, indicating a slot format shown in FIG. 7. The SFI indicates that a slot #10 is UL.

Because a time interval between a moment at which the UE detects the SFI, that is, the slot #5, and an indicated available UL resource, that is, the slot #10, is greater than T, the UE determines a HARQ-ACK feedback time domain position according to the UL resource position indicated by the SFI.

The UE determines to generate a HARQ-ACK codebook 1 in the slot #10. The HARQ-ACK codebook 1 is associated with SPS PDSCH occasions #1 to #9 (because time intervals between slots of the PDSCH occasions #1 to #9 and the slot #10 are greater than or equal to K).

It is assumed that UE receives at least one DL SPS PDSCH in slots n to n+X. If semi-persistent UL/DL configuration indicates that slots n+K to n+X+K are DL or flexible, the UE determines a HARQ-ACK transmission resource according to a resource configured by the network-side device for HARQ-ACK feedback.

It is assumed that K=1 slot.

Figure 8:
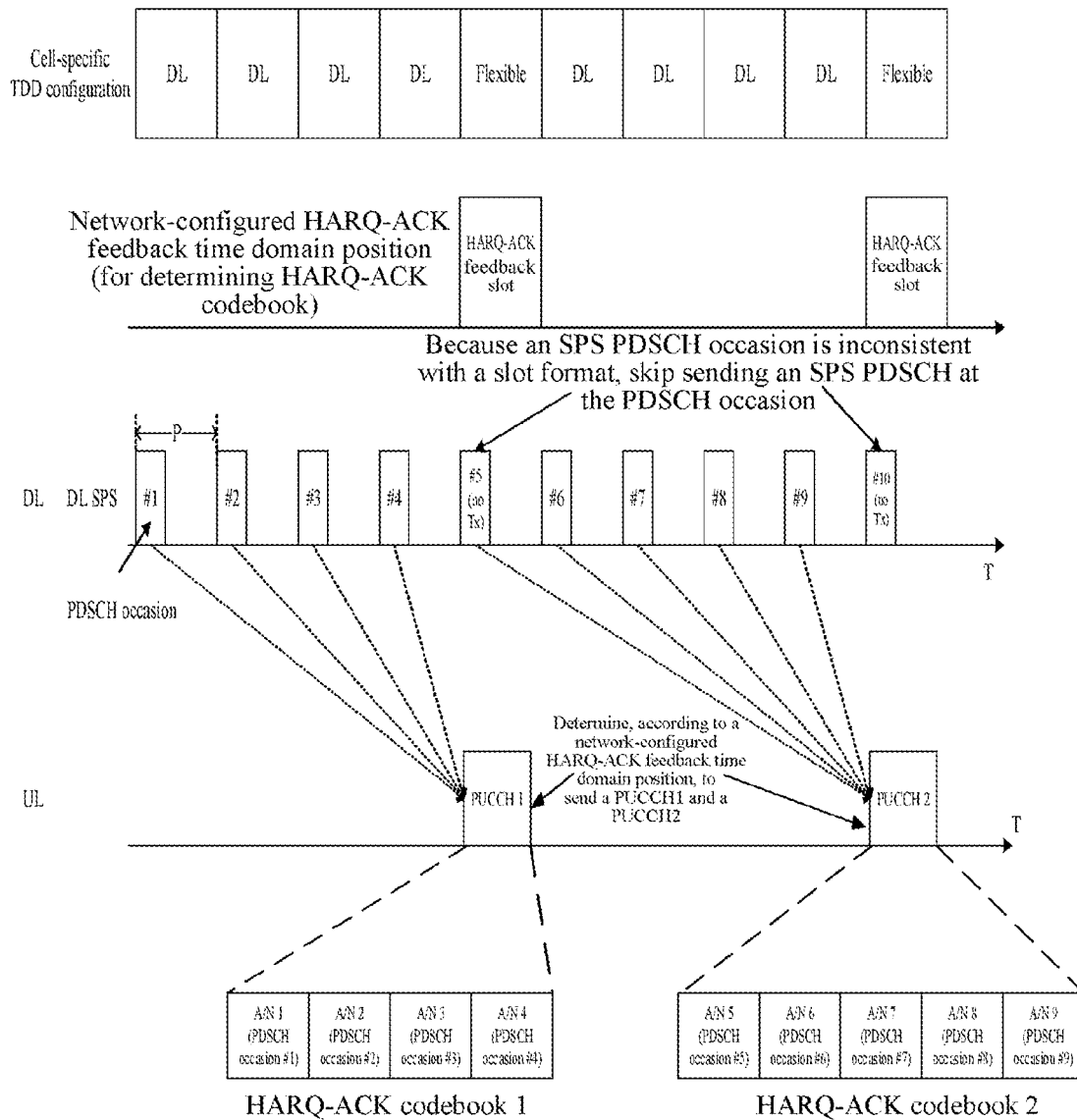
FIG. 8 is a schematic diagram 1 of determining a HARQ-ACK transmission resource according to an embodiment of the present disclosure.

Example 1:

The UE is configured with cell-specific TDD configuration information, indicating a slot format shown in FIG. 8.

The network-side device configures, for the UE, HARQ-ACK feedback time domain positions for determining a HARQ-ACK codebook and transmitting a HARQ-ACK, which are, as shown in FIG. 8, slots #5 and #10.

The UE determines, according to the HARQ-ACK feedback time domain positions configured by the network-side device, to generate a HARQ-ACK codebook 1 in the slot #5. The HARQ-ACK codebook 1 is associated with SPS PDSCH occasions #1 to #4. In addition, the UE determines a HARQ-ACK codebook 2 in the slot #10. The HARQ-ACK codebook 2 is associated with SPS PDSCH occasions #5 to #9.

The UE determines, in the slot #5 according to the HARQ-ACK feedback time domain positions configured by the network-side device, a PUCCH resource for sensing the HARQ-ACK, and sends a PUCCH 1 carrying the HARQ-ACK codebook 1, and determines, in the slot #10, a PUCCH resource for sending the HARQ-ACK, and sends a PUCCH2 carrying a HARQ-ACK codebook 2.

Figure 9:
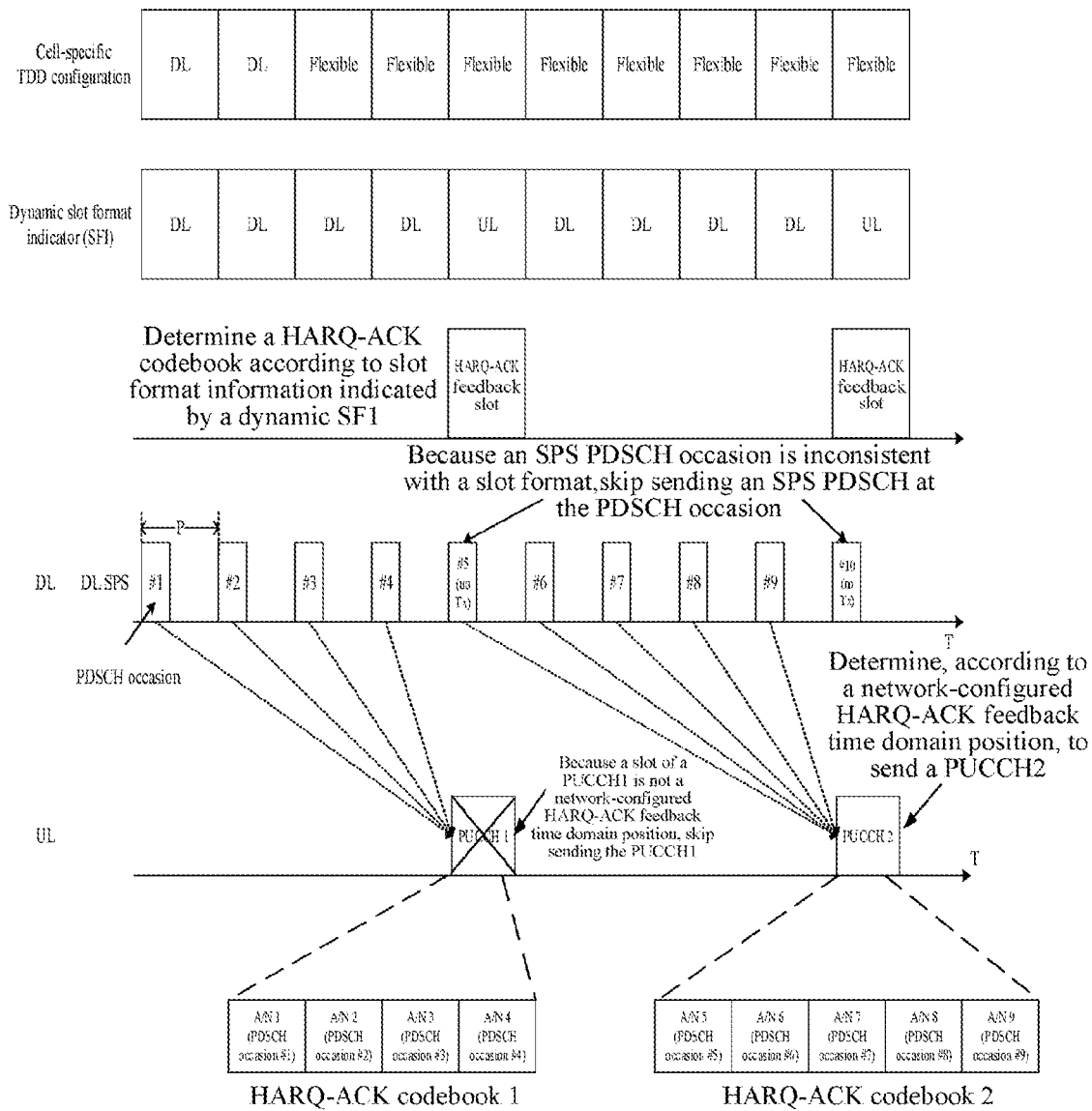
FIG. 9 is a schematic diagram 2 of determining a HARQ-ACK transmission resource according to an embodiment of the present disclosure.

Example 2:

The UE is configured with cell-specific TDD configuration information, indicating a slot format shown in FIG. 9.

The UE is configured to receive a dynamic SFI. The UE detects an SFI, indicating a slot format shown in FIG. 9. The SFI indicates that slots #5 and #10 are UL.

The network-side device configures, for the UE, a HARQ-ACK feedback time domain position for transmitting the HARQ-ACK, which is a slot #10.

The UE determines the HARQ-ACK feedback time domain position according to the UL resource positions indicated by the SFI, and determines to generate a HARQ-ACK codebook 1 in the slot #5. The HARQ-ACK codebook 1 is associated with SPS PDSCH occasions #1 to #4. In addition, the UE determines a HARQ-ACK codebook 2 in the slot #10. The HARQ-ACK codebook 2 is associated with SPS PDSCH occasions #5 to #9.

The UE skips, according to the HARQ-ACK feedback time domain position configured by the network-side device, sending a PUCCH 1 carrying the HARQ-ACK codebook 1 because the slot #5 is not the HARQ-ACK feedback time domain position configured by the network-side device. Moreover, the UE determines, in the slot #10, a PUCCH resource for sending the HARQ-ACK, and sends a PUCCH2 carrying a HARQ-ACK codebook 2.

It is assumed that UE receives at least one DL SPS PDSCH in slots n to n+X. If semi-persistent UL/DL configuration indicates that slots n+K to n+X+K are DL or flexible, the UE determines a transmission resource of the HARQ-ACK according to the UL resources following the slots n+K to n+X+K indicated by the semi-persistent UL/DL configuration.

It is assumed that K=1 slot.

Figure 10:
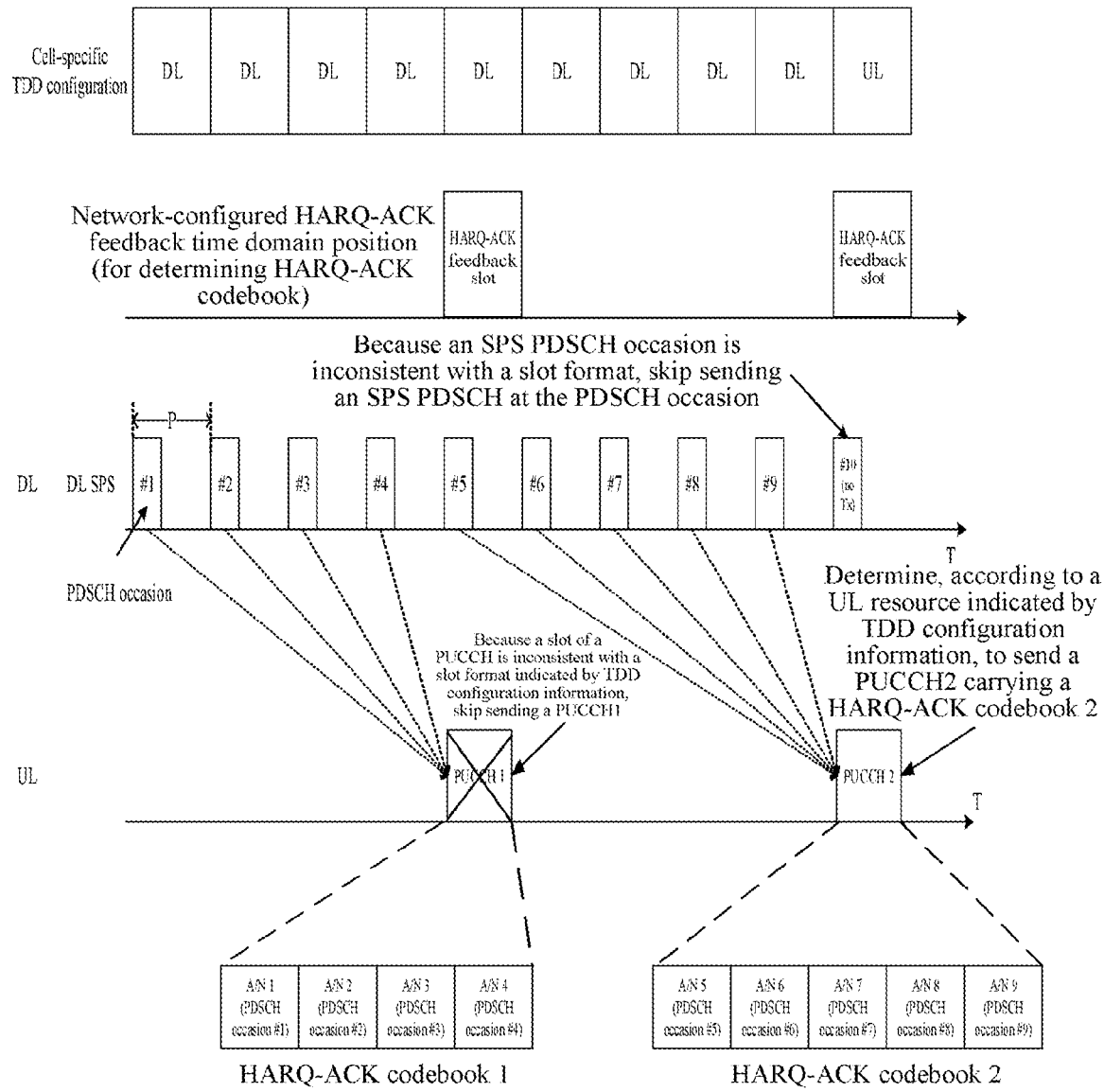
FIG. 10 is a schematic diagram 3 of determining a HARQ-ACK transmission resource according to an embodiment of the present disclosure.

The UE is configured with cell-specific TDD configuration information, indicating a slot format shown in FIG. 10.

The network-side device configures, for the UE, HARQ-ACK feedback time domain positions for determining a HARQ-ACK codebook and transmitting a HARQ-ACK, which are, as shown in FIG. 10, slots #5 and #10.

The UE determines, according to the HARQ-ACK feedback time domain positions configured by the network-side device, to generate a HARQ-ACK codebook 1 in the slot #5. The HARQ-ACK codebook 1 is associated with SPS PDSCH occasions #1 to #4. In addition, the UE determines to generate a HARQ-ACK codebook 2 in the slot #10. The HARQ-ACK codebook 2 is associated with SPS PDSCH occasions #5 to #9.

The UE determines the HARQ-ACK feedback time domain position according to the UL resources indicated by the TDD configuration information. Because the slot #5 is inconsistent with the slot format indicated by the TDD configuration information, the UE skips sending a PUCCH 1 carrying a HARQ-ACK codebook 1 in the slot #5.

Moreover, because the slot #10 is a UL resource indicated by the TDD configuration information, the UE determines, in the slot #10, the PUCCH resource for sending the HARQ-ACK, and sends a PUCCH2 carrying a HARQ-ACK codebook 2.

It is assumed that UE receives at least one DL SPS PDSCH in slots n to n+X. If dynamic UL/DL configuration signaling indicates that slots n+K to n+X+K are DL or flexible, the UE determines a transmission resource of the HARQ-ACK according to the UL resources following the slots n+K to n+X+K indicated by the dynamic UL/DL configuration signaling.

It is assumed that K=1 slot.

Figure 11:
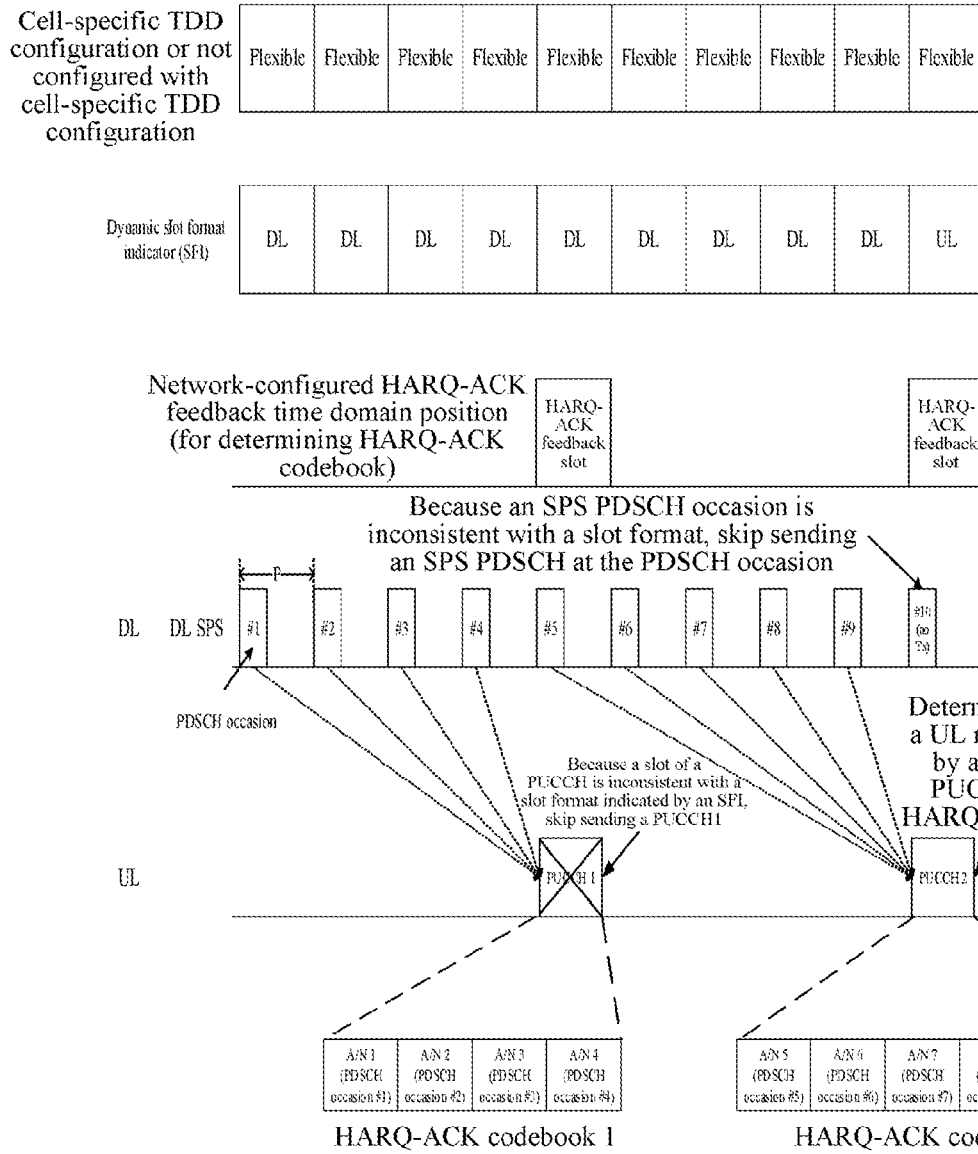
FIG. 11 is a schematic diagram 4 of determining a HARQ-ACK transmission resource according to an embodiment of the present disclosure.

The UE is configured with cell-specific TDD configuration information or is not configured with configured with cell-specific TDD configuration information, indicating a slot format shown in FIG. 11.

The UE is configured to receive a dynamic SFI. The UE detects an SFI, indicating a slot format shown in FIG. 11. The SFI indicates that a slot #10 is UL.

The network-side device configures, for the UE, HARQ-ACK feedback time domain positions for determining a HARQ-ACK codebook and transmitting a HARQ-ACK, which are, as shown in FIG. 11, slots #5 and #10.

The UE determines, according to the HARQ-ACK feedback time domain positions configured by the network-side device, to generate a HARQ-ACK codebook 1 in the slot #5. The HARQ-ACK codebook 1 is associated with SPS PDSCH occasions #1 to #4. In addition, the UE determines to generate a HARQ-ACK codebook 2 in the slot #10. The HARQ-ACK codebook 2 is associated with SPS PDSCH occasions #5 to #9.

The UE determines the HARQ-ACK feedback time domain position according to the UL resources indicated by the SFI. Because the slot #5 is inconsistent with the slot format indicated by the SFI, the UE skips sending a PUCCH 1 carrying a HARQ-ACK codebook 1 in the slot #5.

Moreover, because the slot #10 is a UL resource indicated by the SFI, the UE determines, in the slot #10, the PUCCH resource for sending the HARQ-ACK, and sends a PUCCH2 carrying a HARQ-ACK codebook 2.

In the transmission method of this embodiment, after receiving a PDSCH, the terminal determines a transmission parameter of a HARQ-ACK codebook corresponding to the PDSCH according to a time domain resource format of a transmission resource, so as to reduce inconsistency between the transmission resource of the HARQ-ACK and the slot format, thereby improving the transmission success rate of the HARQ-ACK.

Figure 12:
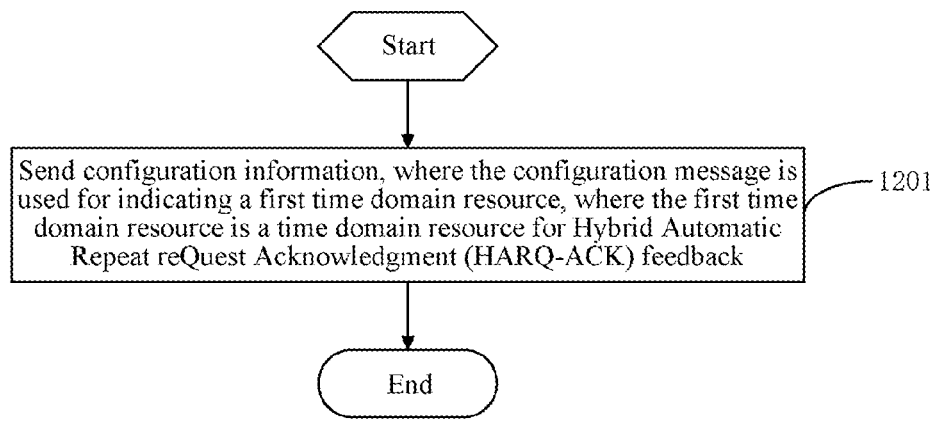
FIG. 12 is a flowchart of a configuration method according to an embodiment of the present disclosure.

FIG. 12 is a flowchart of a configuration method according to an embodiment of the present disclosure, applied to a network-side device. As shown in FIG. 12, the configuration method includes the following steps:

Step 1201: Send configuration information, where the configuration message is used for indicating a first time domain resource, where the first time domain resource is a time domain resource for HARQ-ACK feedback.

It should be noted that this embodiment is an implementation of a corresponding network-side device in the embodiment shown in FIG. 2. For a specific implementation of this embodiment, refer to related descriptions in the embodiment shown in FIG. 2. To avoid repeated descriptions, details are not described again in this embodiment.

Optionally, the first time domain resource is associated with at least one PDSCH transmission occasion, and an offset between the first time domain resource and the at least one PDSCH transmission occasion in time domain is greater than or equal to K time units, where K is indicated by DCI, or K is a default value.

Optionally, the configuration message indicates the first time domain resource using a first parameter group or a second parameter group.

The first parameter group includes a periodicity parameter, used for indicating a repetition period of the first time domain resource; and a first position parameter, used for indicating a time domain position of the first time domain resource within one period.

The second parameter group includes a periodicity parameter, used for indicating a repetition period of the first time domain resource; and a second position parameter, used for indicating a time domain offset of the first time domain resource relative to a period boundary.

For the optional implementation, refer to related descriptions in the embodiment shown in FIG. 2. To avoid repeated descriptions, details are not described again in this embodiment.

In the embodiments of the present disclosure, the network-side device sends configuration information, to allow the terminal to determine the transmission parameter of the HARQ-ACK codebook corresponding to the PDSCH according to the time domain resource for HARQ-ACK feedback indicated in the configuration message, so as to reduce inconsistency between the transmission resource of the HARQ-ACK and the slot format, thereby improving the transmission success rate of the HARQ-ACK.

Figure 13:
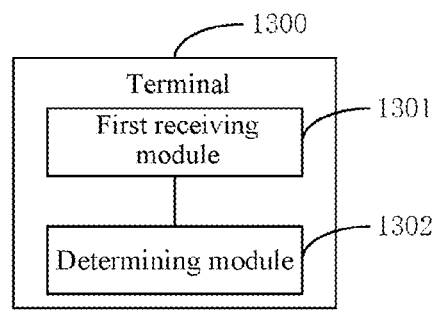
FIG. 13 is a schematic structural diagram of a terminal according to an embodiment of the present disclosure.

FIG. 13 is a schematic structural diagram of a terminal according to an embodiment of the present disclosure. As shown in FIG. 13, a terminal 1300 includes:

a first receiving module 1301, configured to receive a PDSCH; and a determining module 1302, configured to determine a transmission parameter of a HARQ-ACK codebook corresponding to the PDSCH according to a time domain resource format of a transmission resource.

Optionally, the PDSCH is a channel sent based on SPS.

Optionally, the determining module 1302 is configured to determine the transmission parameter of the HARQ-ACK codebook corresponding to the PDSCH according to a target transmission resource, where the target transmission resource is determined according to time domain resource format configuration information or resource usage configuration information.

Optionally, the transmission parameter includes at least one of the following parameters: a time domain position parameter used for indicating a generation position of the HARQ-ACK codebook or a resource indication parameter used for indicating a time domain transmission resource of the HARQ-ACK codebook.

Optionally, the target transmission resource is a transmission resource that can be used to transmit the HARQ-ACK codebook, and a time domain position indicated by the time domain position parameter is a time domain position corresponding to the target transmission resource;

or the target transmission resource is a transmission resource that can be used to transmit the HARQ-ACK codebook, and a time domain resource indicated by the resource indication parameter is the target transmission resource;

or the target transmission resource is a transmission resource that can be used to transmit the HARQ-ACK codebook, a time domain position indicated by the time domain position parameter is a time domain position corresponding to the target transmission resource, and a time domain resource indicated by the resource indication parameter is the target transmission resource.

Optionally, the target transmission resource includes at least one of a first time domain resource, a second time domain resource, or a third time domain resource.

The first time domain resource includes a time domain resource configured by a network-side device for HARQ-ACK feedback.

The second time domain resource includes a time domain resource of which a time domain resource format is UL as indicated by semi-persistent UL/DL configuration.

The third time domain resource includes a time domain resource of which a time domain resource format is UL as indicated by dynamic UL/DL configuration signaling.

Optionally, a time interval between a reception time of the dynamic UL/DL configuration signaling and the third time domain resource in time domain is greater than or equal to a preset value.

Optionally, the first time domain resource is associated with at least one PDSCH transmission occasion, and an offset between the first time domain resource and the at least one PDSCH transmission occasion in time domain is greater than or equal to K time units, where K is indicated by DCI, or K is a default value.

Optionally, the target transmission resource includes a first time domain resource, where the first time domain resource includes a time domain resource configured by the network-side device for HARQ-ACK feedback.

Figure 14:
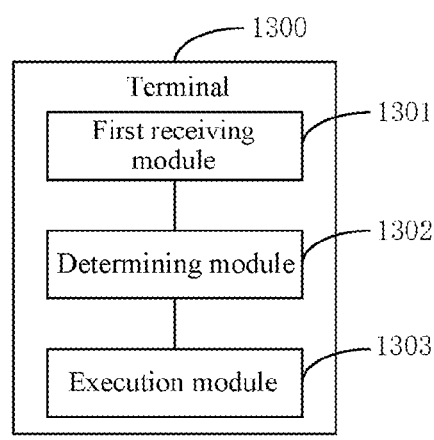
FIG. 14 is a schematic structural diagram of a terminal according to another embodiment of the present disclosure.

As shown in FIG. 14, the terminal 1300 further includes:

an execution module 1303, configured to perform at least one of the following operations when a time domain resource format of the target transmission resource is inconsistent with a time domain resource format indicated by UL/DL configuration: skipping generating the HARQ-ACK codebook at a time domain position corresponding to the target transmission resource, or skipping transmitting the HARQ-ACK codebook on the target transmission resource.

Optionally, the target transmission resource includes a first time domain resource, where the first time domain resource includes a time domain resource configured by the network-side device for HARQ-ACK feedback.

Figure 15:
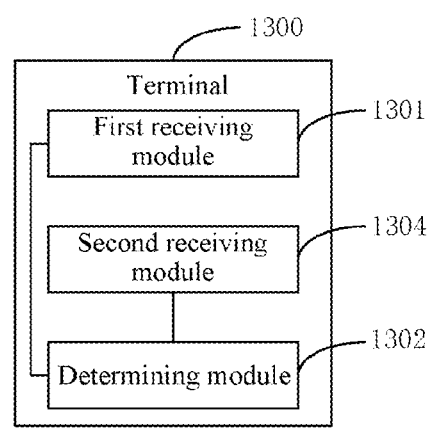
FIG. 15 is a schematic structural diagram of a terminal according to another embodiment of the present disclosure.

As shown in FIG. 15, the terminal 1300 further includes:

a second receiving module 1304, configured to receive a configuration message, where the configuration message is used for indicating the first time domain resource.

Optionally, the configuration message indicates the first time domain resource using a first parameter group or a second parameter group.

The first parameter group includes a periodicity parameter, used for indicating a repetition period of the first time domain resource; and a first position parameter, used for indicating a time domain position of the first time domain resource within one period.

The second parameter group includes a periodicity parameter, used for indicating a repetition period of the first time domain resource; and a second position parameter, used for indicating a time domain offset of the first time domain resource relative to a period boundary.

Optionally, the determining module 1302 is configured to determine the transmission parameter of the HARQ-ACK codebook corresponding to the PDSCH according to the time domain resource format of the transmission resource when the HARQ-ACK codebook cannot be transmitted in a feedback slot, where a slot offset between the feedback slot and a reception slot of the PDSCH is K, where K is indicated by DCI, or K is a default value.

The terminal 1300 can implement the processes implemented by the terminal in the method embodiment of FIG. 2. To avoid repetition, details are not described herein again. In the embodiments of the present disclosure, after receiving a PDSCH, the terminal 1300 determines a transmission parameter of a HARQ-ACK codebook corresponding to the PDSCH according to a time domain resource format of a transmission resource, so as to reduce inconsistency between the transmission resource of the HARQ-ACK and the slot format, thereby improving the transmission success rate of the HARQ-ACK.

Figure 16:
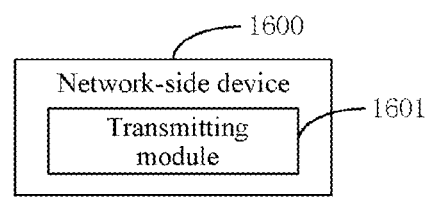
FIG. 16 is a schematic structural diagram of a network-side device according to an embodiment of the present disclosure.

FIG. 16 is a schematic structural diagram of a network-side device according to an embodiment of the present disclosure. As shown in FIG. 16, a network-side device 1600 includes:

a transmitting module 1601, configured to send configuration information, where the configuration message is used for indicating a first time domain resource, where the first time domain resource is a time domain resource for HARQ-ACK feedback.

Optionally, the first time domain resource is associated with at least one PDSCH transmission occasion, and an offset between the first time domain resource and the at least one PDSCH transmission occasion in time domain is greater than or equal to K time units, where K is indicated by DCI, or K is a default value.

Optionally, the configuration message indicates the first time domain resource using a first parameter group or a second parameter group.

The first parameter group includes a periodicity parameter, used for indicating a repetition period of the first time domain resource; and a first position parameter, used for indicating a time domain position of the first time domain resource within one period.

The second parameter group includes a periodicity parameter, used for indicating a repetition period of the first time domain resource; and a second position parameter, used for indicating a time domain offset of the first time domain resource relative to a period boundary.

The network-side device 1600 can implement the processes implemented by the network-side device in the method embodiment of FIG. 12. To avoid repetition, details are not described herein again. In the embodiments of the present disclosure, the network-side device 1600 sends configuration information, to allow the terminal to determine the transmission parameter of the HARQ-ACK codebook corresponding to the PDSCH according to the time domain resource for HARQ-ACK feedback indicated in the configuration message, so as to reduce inconsistency between the transmission resource of the HARQ-ACK and the slot format, thereby improving the transmission success rate of the HARQ-ACK.

Figure 17:
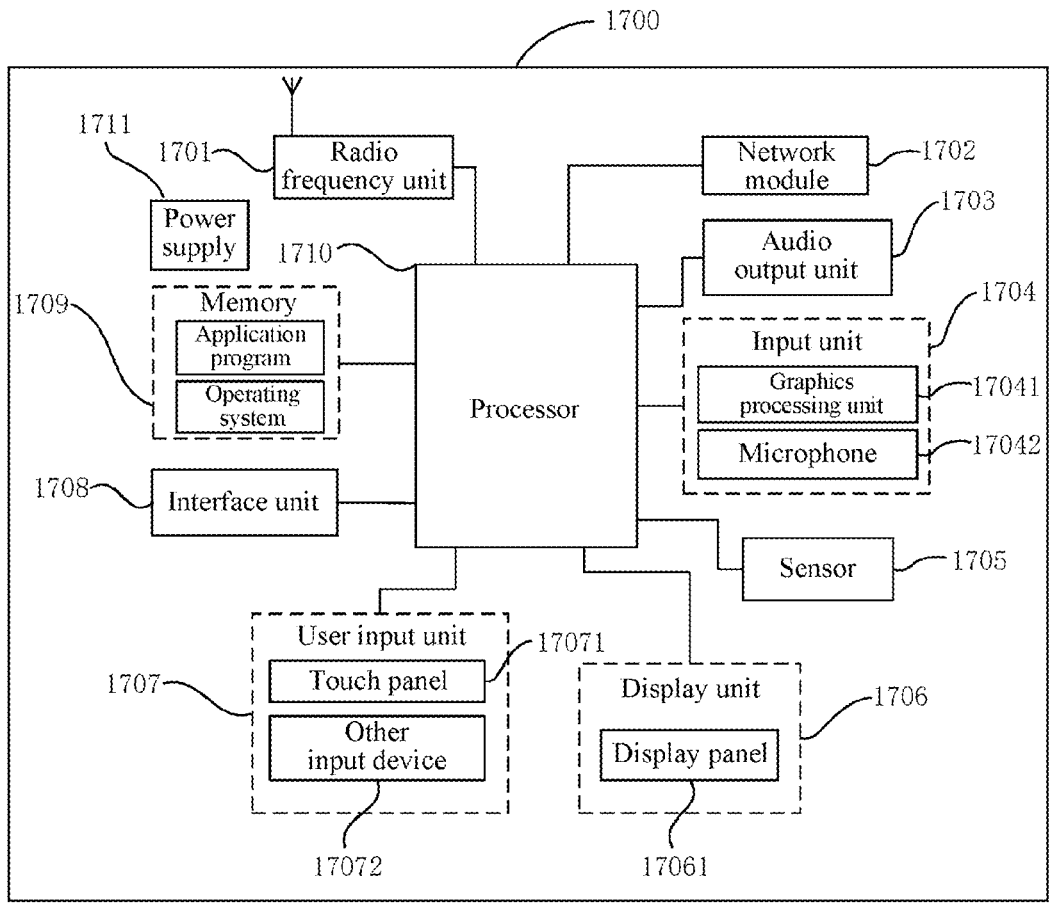
FIG. 17 is a schematic diagram of a hardware structure of a terminal according to an embodiment of the present disclosure.

FIG. 17 is a schematic diagram of a hardware structure of a terminal according to the embodiments of the present disclosure. The terminal 800 includes, but is not limited to, components such as a radio frequency unit 1701, a network module 1702, an audio output unit 1703, an input unit 1704, a sensor 1705, a display unit 1706, a user input unit 1707, an interface unit 1708, a memory 1709, a processor 1710, and a power supply 1711. A person skilled in the art may understand that the terminal structure shown in FIG. 17 does not constitute a limitation on the terminal, and the terminal may include more or fewer components than shown, or combine some components, or have different component arrangements. In the embodiments of the present disclosure, the terminal includes, but is not limited to, a mobile phone, a tablet computer, a notebook computer, a handheld computer, an in-vehicle terminal, a wearable device, a pedometer, and the like.

The radio frequency unit 1701 is configured to receive a PDSCH.

The processor 1710 is configured to determine a transmission parameter of a HARQ-ACK codebook corresponding to the PDSCH according to a time domain resource format of a transmission resource.

Optionally, the PDSCH is a channel sent based on SPS.

Optionally, the processor 1710 is further configured to:

determine the transmission parameter of the HARQ-ACK codebook corresponding to the PDSCH according to a target transmission resource, where the target transmission resource is determined according to time domain resource format configuration information or resource usage configuration information.

Optionally, the transmission parameter includes at least one of the following parameters: a time domain position parameter used for indicating a generation position of the HARQ-ACK codebook or a resource indication parameter used for indicating a time domain transmission resource of the HARQ-ACK codebook.

Optionally, the target transmission resource is a transmission resource that can be used to transmit the HARQ-ACK codebook, and a time domain position indicated by the time domain position parameter is a time domain position corresponding to the target transmission resource;

or the target transmission resource is a transmission resource that can be used to transmit the HARQ-ACK codebook, and a time domain resource indicated by the resource indication parameter is the target transmission resource;

or the target transmission resource is a transmission resource that can be used to transmit the HARQ-ACK codebook, a time domain position indicated by the time domain position parameter is a time domain position corresponding to the target transmission resource, and a time domain resource indicated by the resource indication parameter is the target transmission resource.

Optionally, the target transmission resource includes at least one of a first time domain resource, a second time domain resource, or a third time domain resource.

The first time domain resource includes a time domain resource configured by a network-side device for HARQ-ACK feedback.

The second time domain resource includes a time domain resource of which a time domain resource format is UL as indicated by semi-persistent UL/DL configuration.

The third time domain resource includes a time domain resource of which a time domain resource format is UL as indicated by dynamic UL/DL configuration signaling.

Optionally, a time interval between a reception time of the dynamic UL/DL configuration signaling and the third time domain resource in time domain is greater than or equal to a preset value.

Optionally, the first time domain resource is associated with at least one PDSCH transmission occasion, and an offset between the first time domain resource and the at least one PDSCH transmission occasion in time domain is greater than or equal to K time units, where K is indicated by DCI, or K is a default value.

Optionally, the target transmission resource includes a first time domain resource, where the first time domain resource includes a time domain resource configured by the network-side device for HARQ-ACK feedback.

The processor 1710 is further configured to:

perform at least one of the following operations when a time domain resource format of the target transmission resource is inconsistent with a time domain resource format indicated by UL/DL configuration: skipping generating the HARQ-ACK codebook at a time domain position corresponding to the target transmission resource, or skipping transmitting the HARQ-ACK codebook on the target transmission resource.

Optionally, the target transmission resource includes a first time domain resource, where the first time domain resource includes a time domain resource configured by the network-side device for HARQ-ACK feedback.

The radio frequency unit 1701 is further configured to:

receive a configuration message, where the configuration message is used for indicating the first time domain resource.

Optionally, the configuration message indicates the first time domain resource using a first parameter group or a second parameter group.

The first parameter group includes a periodicity parameter, used for indicating a repetition period of the first time domain resource; and a first position parameter, used for indicating a time domain position of the first time domain resource within one period.

The second parameter group includes a periodicity parameter, used for indicating a repetition period of the first time domain resource; and a second position parameter, used for indicating a time domain offset of the first time domain resource relative to a period boundary.

Optionally, the processor 1710 is further configured to:

determine a feedback slot of the PDSCH, where a slot offset between the feedback slot and a reception slot of the PDSCH is K, where K is indicated by DCI, or K is a default value; and determine a transmission parameter of a HARQ-ACK codebook corresponding to the PDSCH according to a time domain resource format of the transmission resource when the HARQ-ACK codebook cannot be transmitted in the feedback slot.

The terminal 1700 can implement the processes implemented by the terminal in the foregoing embodiments. To avoid repetition, details are not described herein again. In the embodiments of the present disclosure, after receiving a PDSCH, the terminal 1700 determines a transmission parameter of a HARQ-ACK codebook corresponding to the PDSCH according to a time domain resource format of a transmission resource, so as to reduce inconsistency between the transmission resource of the HARQ-ACK and the slot format, thereby improving the transmission success rate of the HARQ-ACK.

It should be understood that in this embodiment of the present disclosure, the radio frequency unit 1701 may be configured to receive and transmit information or receive and transmit a signal during a call. Specifically, after DL data from a base station is received, the DL data is sent to the processor 1710 for processing. In addition, UL data is sent to the base station. Generally, the radio frequency unit 1701 includes, but is not limited to, an antenna, at least one amplifier, a transceiver, a coupler, a low noise amplifier, a duplexer, and the like. In addition, the radio frequency unit 1701 may further communicate with another device through a wireless communications system and network.

The terminal may provide, by using the network module 1702, wireless broadband Internet access for a user, for example, help the user to receive or send an email, browse a webpage, and access stream media.

The audio output unit 1703 may convert audio data received by the radio frequency unit 1701 or the network module 1702 or stored on the memory 1709 into audio signals and output the audio signals as sounds. In addition, the audio output unit 1703 may further provide audio output related to specific functions implemented by the terminal 1700 (for example, a call signal receiving sound and a message receiving sound). The audio output unit 1703 includes a speaker, a buzzer, a receiver, and the like.

The input unit 1704 is configured to receive an audio or video signal. The input unit 1704 may include a graphics processing unit (GPU) 17041 and a microphone 17042. The GPU 17041 processes image data of a static picture or a video acquired by an image capturing device (for example, a camera) in a video capturing mode or an image capturing mode. The processed image frame can be displayed on the display unit 1706. The image frame processed by the GPU 17041 may be stored on the memory 1709 (or another storage medium) or sent through the radio frequency unit 1701 or the network module 1702. The microphone 17042 can receive sounds and can process such sounds as audio data. The processed audio data can be converted a phone call mode into an output in a format that can sent by the radio frequency unit 1701 to a mobile communications base station.

The terminal 1700 further includes at least one sensor 1705 such as an optical sensor, a motion sensor, or another sensor. Specifically, the optical sensor includes an ambient light sensor and a proximity sensor. The ambient light sensor may adjust luminance of the display panel 17061 according to brightness of the ambient light. The proximity sensor may switch off the display panel 17061 and/or backlight when the terminal 1700 is moved to the ear. As one type of motion sensor, an accelerometer sensor can detect magnitudes of accelerations in various directions (generally, on three axes), may detect a magnitude and a direction of the gravity when static, and may be applied to recognizing the attitude of the terminal (for example, switching between landscape orientation and portrait orientation, a related game, and magnetometer attitude calibration), a function related to vibration recognition (such as a pedometer and a knock), and the like. The sensor 1705 may further include a fingerprint sensor, a pressure sensor, an iris sensor, a molecular sensor, a gyroscope, a barometer, a hygrometer, a thermometer, an infrared sensor, and the like, which are not described herein in detail.

The display unit 1706 is configured to display information inputted by the user or information provided for the user. The display unit 1706 may include a display panel 17061. The display panel 17061 may be configured in the form of a liquid crystal display (LCD), an organic light-emitting diode (OLED), or the like.

The user input unit 1707 may be configured to receive input digit or character information, and generate a keyboard signal input related to the user setting and function control of the terminal. Specifically, the user input unit 1707 includes a touch panel 17071 and another input device 17072. The touch panel 17071, also referred to as a touchscreen, may collect a touch operation of a user on or near the touch panel (such as an operation of a user on or near the touch panel 17071 by using any suitable object or attachment, such as a finger or a stylus). The touch panel 17071 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and transmits the touch point coordinates to the processor 1710. In addition, the touch controller receives a command transmitted by the processor 1710 and execute the command In addition, the touch panel 17071 may be implemented by using various types, such as a resistive type, a capacitive type, an infrared type, and a surface acoustic wave type. In addition to the touch panel 17071, the user input unit 1707 may further include the another input device 17072. Specifically, the another input device 17072 may include, but not limited to, a physical keyboard, a functional key (such as a volume control key or a switch key), a track ball, a mouse, and a joystick, which are not described herein in detail.

Further, the touch panel 17071 may cover the display panel 17061. After detecting a touch operation on or near the touch panel, the touch panel 17071 transfers the touch operation to the processor 1710, to determine a type of a touch event. Then, the processor 1710 provides a corresponding visual output on the display panel 17061 according to the type of the touch event. In FIG. 17, the touch panel 17071 and the display panel 17061 implement, as two independent parts, input and output functions of the terminal. However, in some embodiments, the touch panel 17071 and the display panel 17061 may be integrated to implement the input and output functions of the terminal. The details are not limited herein.

The interface unit 1708 is an interface for connecting an external apparatus and the terminal 1700. For example, the interface unit 1708 may include a wired or wireless headset port, an external power supply (or battery charger) port, a wired or wireless data port, a memory card port, a port for connecting an apparatus with a recognition module, an audio input/output (I/O) port, a video I/O port, a headphone port, and the like. The interface unit 1708 may be configured to receive input (for example, data information or power) from an external apparatus and transmit the received input to one or more elements in the terminal 1700 or may be configured to transmit data between the terminal 1700 and the external apparatus.

The memory 1709 may be configured to store a software program and various data. The memory 1709 may mainly include a program storage area and a data storage area. The program storage area may store an operating system, an application program required by at least one function (for example, a sound playback function and an image display function), and the like. The data storage area may store data (for example, audio data and an address book) created according to the use of the mobile phone, and the like. In addition, the memory 1709 may include a high speed RAM, and may further include a non-volatile memory, such as at least one magnetic disk storage device, a flash memory, or another volatile solid storage device.

The processor 1710 is a control center of the terminal, and connects to various parts of the terminal by using various interfaces and lines. By running or executing the software program and/or module stored in the memory 1709, and invoking data stored in the memory 1709, the processor performs various functions and data processing of the terminal, thereby performing overall monitoring on the terminal. The processor 1710 may include one or more processing units. Preferably, the processor 1710 may integrate an application processor and a modem processor. The application processor mainly processes an operating system, a user interface, an application program, and the like. The modem processor mainly processes wireless communication. It may be understood that the modem processor may either not be integrated into the processor 1710.

The terminal 1700 may further include the power supply 1711 (such as a battery) for supplying power to the components. Preferably, the power supply 1711 may be logically connected to the processor 1710 by a power management system, thereby implementing functions such as charging, discharging, and power consumption management by using the power management system.

In addition, the terminal 1700 includes some functional module that are not shown, which are not described herein in detail.

Preferably, the embodiments of the present disclosure further provide a terminal, including a processor 1710, a memory 1709, and a computer program on the memory 1709 and executed on the processor 1710, where when executed by the processor 1710, the computer program implements the processes of the embodiment of the transmission method, and can achieve the same technical effects. To avoid repetition, details are not described herein again.

The embodiments of the present disclosure further provide a computer-readable storage medium, storing a computer program, where when executed by a processor, the computer program implements the processes of the embodiment of the transmission method shown in FIG. 2, and can achieve the same technical effects. To avoid repetition, details are not described herein again. The computer-readable storage medium is, for example, a read-only memory (ROM), a random access memory (RAM), a magnetic disk, or an optical disc.

Figure 18:
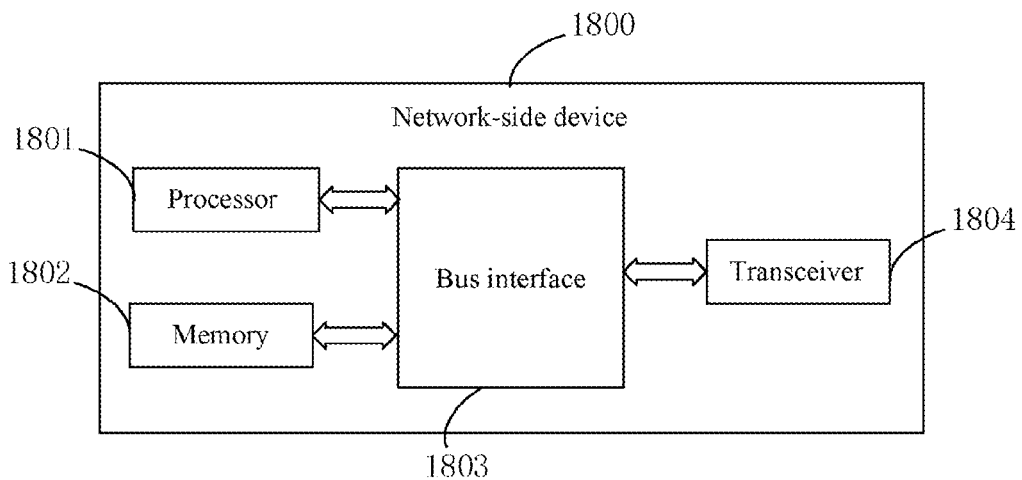
FIG. 18 is a schematic structural diagram of another network-side device according to an embodiment of the present disclosure.

FIG. 18 is a schematic structural diagram of another network-side device according to an embodiment of the present disclosure. As shown in FIG. 18, a network-side device 1800 includes: a processor 1801, a memory 1802, a bus interface 1803, and a transceiver 1804. The processor 1801, the memory 1802, and the transceiver 1804 are all connected to the bus interface 1803.

In this embodiment of the present disclosure, the network-side device 1800 further includes: a computer program stored on the memory 1802 and executable by the processor 1801, when executed by the processor 1801, the computer program implementing the following step:

sending configuration information through the transceiver 1804, where the configuration message is used for indicating a first time domain resource, where the first time domain resource is a time domain resource for HARQ-ACK feedback.

Optionally, the first time domain resource is associated with at least one PDSCH transmission occasion, and an offset between the first time domain resource and the at least one PDSCH transmission occasion in time domain is greater than or equal to K time units, where K is indicated by DCI, or K is a default value.

Optionally, the configuration message indicates the first time domain resource using a first parameter group or a second parameter group.

The first parameter group includes a periodicity parameter, used for indicating a repetition period of the first time domain resource; and a first position parameter, used for indicating a time domain position of the first time domain resource within one period.

The second parameter group includes a periodicity parameter, used for indicating a repetition period of the first time domain resource; and a second position parameter, used for indicating a time domain offset of the first time domain resource relative to a period boundary.

The embodiments of the present disclosure further provide a computer-readable storage medium, storing a computer program, where when executed by a processor, the computer program implements the processes of the embodiment of the configuration method shown in FIG. 12, and can achieve the same technical effects. To avoid repetition, details are not described herein again. The computer-readable storage medium is, for example, a ROM, a RAM, a magnetic disk, or an optical disc.

It should be noted that the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses.

Through the descriptions of the foregoing implementations, a person skilled in the art may clearly understand that the methods in the foregoing embodiments may be implemented by means of software and a necessary general hardware platform, and certainly, may also be implemented by hardware, but in many cases, the former manner is a better implementation. Based on such understanding, the technical solutions of the present disclosure or a part thereof that makes a contribution to the prior art may be essentially embodied in a form of a software product. The computer software product is stored in a storage medium (such as a ROM/RAM, a disk, and an optical disk), including several instructions to enable one terminal (which may be a mobile phone, a computer, a server, an air conditioner a network device, or the like) to perform the methods in the embodiments of the present disclosure.

The embodiments of the present disclosure are described above with reference to the accompanying drawings. However, the present disclosure is not limited to the foregoing specific implementations. The foregoing specific implementations are illustrative instead of limitative. Enlightened by the present disclosure, a person of ordinary skill in the art can make many forms without departing from the idea of the present disclosure and the scope of protection of the claims. All of the forms fall within the protection of the present disclosure.

What is claimed is:

1. A transmission method, applied to a terminal, the method comprising:
   receiving a physical downlink shared channel (PDSCH); and
   determining a transmission parameter of a Hybrid Automatic Repeat reQuest Acknowledgment (HARQ-ACK) codebook corresponding to the PDSCH according to a time domain resource format of a transmission resource;
   wherein the determining a transmission parameter of a HARQ-ACK codebook corresponding to the PDSCH according to a time domain resource format of a transmission resource further comprises:
   determining the transmission parameter of the HARQ-ACK codebook corresponding to the PDSCH according to a target transmission resource, wherein the target transmission resource is determined according to time domain resource format configuration information or resource usage configuration information;
   wherein the target transmission resource comprises at least one of a first time domain resource, a second time domain resource, or a third time domain resource, wherein:
   the first time domain resource comprises a time domain resource configured by a network-side device for HARQ-ACK feedback;
   the second time domain resource comprises a time domain resource of which a time domain resource format is uplink (UL) as indicated by semi-persistent UL/downlink (DL) configuration; and
   the third time domain resource comprises a time domain resource of which a time domain resource format is UL as indicated by dynamic UL/DL configuration signaling, wherein a time interval between a reception time of the dynamic UL/DL configuration signaling and the third time domain resource in time domain is greater than or equal to a preset value.

2. The transmission method according to claim 1, wherein the PDSCH is a channel sent based on Semi-Persistent Scheduling (SPS).

3. The transmission method according to claim 1, wherein the transmission parameter comprises at least one of the following parameters: a time domain position parameter used for indicating a generation position of the HARQ-ACK codebook or a resource indication parameter used for indicating a time domain transmission resource of the HARQ-ACK codebook.

4. The transmission method according to claim 3, wherein the target transmission resource is a transmission resource that can be used to transmit the HARQ-ACK codebook, and a time domain position indicated by the time domain position parameter is a time domain position corresponding to the target transmission resource;

or the target transmission resource is a transmission resource that can be used to transmit the HARQ-ACK codebook, and a time domain resource indicated by the resource indication parameter is the target transmission resource;

or the target transmission resource is a transmission resource that can be used to transmit the HARQ-ACK codebook, a time domain position indicated by the time domain position parameter is a time domain position corresponding to the target transmission resource, and a time domain resource indicated by the resource indication parameter is the target transmission resource.

5. The transmission method according to claim 1, wherein the first time domain resource is associated with at least one PDSCH transmission occasion, and an offset between the first time domain resource and the at least one PDSCH transmission occasion in time domain is greater than or equal to K time units, wherein K is indicated by downlink control information (DCI), or K is a default value.

6. The transmission method according to claim 1, wherein the target transmission resource comprises a first time domain resource, wherein the first time domain resource comprises a time domain resource configured by a network-side device for HARQ-ACK feedback; and after the determining a transmission parameter of a HARQ-ACK codebook corresponding to the PDSCH according to a time domain resource format of a transmission resource, the transmission method further comprises:

performing at least one of the following operations when a time domain resource format of the target transmission resource is inconsistent with a time domain resource format indicated by UL/DL configuration: skipping generating the HARQ-ACK codebook at a time domain position corresponding to the target transmission resource, or skipping transmitting the HARQ-ACK codebook on the target transmission resource.

7. The transmission method according to claim 1, wherein the target transmission resource comprises a first time domain resource, wherein the first time domain resource comprises a time domain resource configured by a network-side device for HARQ-ACK feedback; and the transmission method further comprises:

receiving a configuration message, wherein the configuration message is used for indicating the first time domain resource.

8. The transmission method according to claim 7, wherein the configuration message indicates the first time domain resource using a first parameter group or a second parameter group;

the first parameter group comprises a periodicity parameter, used for indicating a repetition period of the first time domain resource; and a first position parameter, used for indicating a time domain position of the first time domain resource within one period; and the second parameter group comprises a periodicity parameter, used for indicating a repetition period of the first time domain resource; and a second position parameter, used for indicating a time domain offset of the first time domain resource relative to a period boundary.

9. The transmission method according to claim 1, wherein the determining a transmission parameter of a HARQ-ACK codebook corresponding to the PDSCH according to a time domain resource format of a transmission resource further comprises:

determining the transmission parameter of the HARQ-ACK codebook corresponding to the PDSCH according to the time domain resource format of the transmission resource when the HARQ-ACK codebook cannot be transmitted in a feedback slot, wherein a slot offset between the feedback slot and a reception slot of the PDSCH is K, wherein K is indicated by downlink control information (DCI), or K is a default value.

10. A terminal, comprising a processor, a memory, and a computer program stored on the memory and executable on the processor, wherein the computer program, when executed by the processor, to implements:

receiving a physical downlink shared channel (PDSCH); and determining a transmission parameter of a Hybrid Automatic Repeat reQuest Acknowledgment (HARQ-ACK) codebook corresponding to the PDSCH according to a time domain resource format of a transmission resource;

wherein the determining a transmission parameter of a HARQ-ACK codebook corresponding to the PDSCH according to a time domain resource format of a transmission resource further comprises:

determining the transmission parameter of the HARQ-ACK codebook corresponding to the PDSCH according to a target transmission resource, wherein the target transmission resource is determined according to time domain resource format configuration information or resource usage configuration information;

wherein the target transmission resource comprises at least one of a first time domain resource, a second time domain resource, or a third time domain resource, wherein:

the first time domain resource comprises a time domain resource configured by a network-side device for HARQ-ACK feedback;

the second time domain resource comprises a time domain resource of which a time domain resource format is uplink (UL) as indicated by semi-persistent UL/downlink (DL) configuration; and the third time domain resource comprises a time domain resource of which a time domain resource format is UL as indicated by dynamic UL/DL configuration signaling.

11. The terminal according to claim 10, wherein the transmission parameter comprises at least one of the following parameters: a time domain position parameter used for indicating a generation position of the HARQ-ACK codebook or a resource indication parameter used for indicating a time domain transmission resource of the HARQ-ACK codebook.

12. The terminal according to claim 11, wherein the target transmission resource is a transmission resource that can be used to transmit the HARQ-ACK codebook, and a time domain position indicated by the time domain position parameter is a time domain position corresponding to the target transmission resource;

or the target transmission resource is a transmission resource that can be used to transmit the HARQ-ACK codebook, and a time domain resource indicated by the resource indication parameter is the target transmission resource;

or the target transmission resource is a transmission resource that can be used to transmit the HARQ-ACK codebook, a time domain position indicated by the time domain position parameter is a time domain position corresponding to the target transmission resource, and a time domain resource indicated by the resource indication parameter is the target transmission resource.

\* \* \* \* \*